United States Patent
Hinckley et al.

(10) Patent No.: US 11,429,203 B2
(45) Date of Patent: Aug. 30, 2022

(54) TILT-RESPONSIVE TECHNIQUES FOR DIGITAL DRAWING BOARDS

(71) Applicant: Microsoft Technology Licensing, LLC, Redmond, WA (US)

(72) Inventors: Kenneth Paul Hinckley, Kirkland, WA (US); Hugo Karl Denis Romat, Zurich (CH); Christopher Mervin Collins, Toronto (CA); Nathalie Riche, Issaquah, WA (US); Michel Pahud, Kirkland, WA (US); Adam Samuel Riddle, Seattle, WA (US); William Arthur Stewart Buxton, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/907,028

(22) Filed: Jun. 19, 2020

(65) Prior Publication Data
US 2021/0397274 A1   Dec. 23, 2021

(51) Int. Cl.
*G06F 3/0346* (2013.01)
*G06F 3/04812* (2022.01)
*G06F 3/04883* (2022.01)

(52) U.S. Cl.
CPC ........ *G06F 3/0346* (2013.01); *G06F 3/04812* (2013.01); *G06F 3/04883* (2013.01)

(58) Field of Classification Search
CPC .............. G06F 3/0346; G06F 3/04812; G06F 3/04883; G06F 3/04886; G06F 3/1423; G06F 1/1647; G06F 1/1677
See application file for complete search history.

(56) References Cited

U.S. PATENT DOCUMENTS 7,630,193 B2 *  12/2009  Ledbetter ............... F16M 11/10
                                                    361/679.21
8,902,181 B2 *  12/2014  Hinckley ................ G06F 3/017
                                                    345/173

(Continued)

OTHER PUBLICATIONS

"Flux Digital Tabletop: A Tilting Multi-Touch and Pen Based Surface", Retrieved from: https://www.youtube.com/watch?v=WiWOEkewcro, Apr. 24, 2009, 01 Page.

(Continued)

*Primary Examiner* — Kenneth Bukowski

(57) ABSTRACT

Methods and systems are provided that are directed to automatically adjusting a user interface based on tilt position of a digital drawing board. The digital drawing board has a tiltable screen with a sensor. The tiltable screen may be fixed in a stable tilt position. A sensor is used to determine that the digital drawing board has a first tilt position. The digital drawing board displays a first user interface associated with the first tilt position. The first user interface may be associated with a first use mode. The first user interface may also be based on an application running on the digital drawing board. When the sensor senses that the digital drawing board has moved from the first tilt position to a second tilt position, it automatically displays a second user interface associated with a second tilt position. The second user interface has different functionality than the first user interface. The second user interface may be associated with a second use mode that is different than the first use mode but may be based on the same application as the first user interface.

20 Claims, 23 Drawing Sheets

(56) References Cited

U.S. PATENT DOCUMENTS

| | | | | |
|---|---|---|---|---|
| 8,982,045 B2* | 3/2015 | Hinckley | | G06F 3/017 |
| | | | | 345/156 |
| 9,020,615 B2* | 4/2015 | Rihn | | F16M 11/10 |
| | | | | 700/19 |
| 9,035,742 B2* | 5/2015 | Rihn | | G05B 15/02 |
| | | | | 340/4.3 |
| 9,244,495 B2* | 1/2016 | Miller | | G06F 3/016 |
| 9,298,496 B2* | 3/2016 | Zhang | | G06F 1/1626 |
| 9,990,059 B2* | 6/2018 | Vong | | G06F 3/041 |
| 2007/0058329 A1 | 3/2007 | Ledbetter et al. | | |
| 2010/0085274 A1 | 4/2010 | Kilpatrick et al. | | |
| 2012/0299813 A1* | 11/2012 | Kang | | G06F 3/0485 |
| | | | | 345/156 |
| 2013/0021241 A1 | 1/2013 | Masaki et al. | | |
| 2013/0328929 A1 | 12/2013 | Jeung et al. | | |
| 2014/0085814 A1* | 3/2014 | Kielland | | F16M 11/10 |
| | | | | 361/679.55 |
| 2014/0101577 A1* | 4/2014 | Kwak | | G06F 3/1431 |
| | | | | 715/761 |
| 2015/0103014 A1* | 4/2015 | Kim | | G06F 3/03545 |
| | | | | 345/173 |
| 2015/0192966 A1 | 7/2015 | Kim et al. | | |
| 2017/0052566 A1 | 2/2017 | Ka et al. | | |
| 2017/0094156 A1* | 3/2017 | Kim | | H04M 1/72469 |
| 2017/0147093 A1* | 5/2017 | Funase | | G06F 1/163 |
| 2018/0129459 A1* | 5/2018 | Sylvan | | G06F 3/167 |
| 2018/0314291 A1 | 11/2018 | Costa | | |
| 2020/0192497 A1* | 6/2020 | Knoppert | | G06F 3/0412 |

OTHER PUBLICATIONS

"TimeTilt: Using Sensor-Based Gestures to Travel Through Multiple Applications on a Mobile Device", Retrieved from: https://www.youtube.com/watch?feature=player_embedded&v=7JBSpojUBm8, Jun. 3, 2009, 01 Page.

Leitner, et al., "Flux: A Tilting Multi-Touch and Pen Based Surface", In Proceedings of Extended Abstracts on Human Factors in Computing Systems, Apr. 4, 2009, pp. 3211-3216.

Roudaut, et al., "TimeTilt: Using Sensor-Based Gestures to Travel through Multiple Applications on a Mobile Device", In Proceedings of International Federation for Information Processing Conference on Human-Computer Interaction, Aug. 24, 2009, pp. 830-834.

"Invitation to Pay Additional Fees Issued in PCT Application No. PCT/US21/031661", dated Aug. 18, 2021, 19 Pages.

"International Search Report and Written Opinion Issued in PCT Application No. PCT/US21/031661", dated Oct. 13, 2021, 25 Pages.

* cited by examiner

TILT-RESPONSIVE TECHNIQUES FOR DIGITAL DRAWING BOARDS

BACKGROUND

Digital drawing boards offer a self-stable work surface that is continuously adjustable. On digital displays, such as the Microsoft™ Surface Studio™, these properties open up a class of techniques that sense and respond to tilt adjustments.

Display orientation—whether horizontal, vertical, or some angled posture in-between—strongly shapes people's behavior and expectations. Horizontal tabletops invite collaboration. The ergonomics of a vertical monitor afford reading a document, but not annotating it with a stylus. And indeed "going back to the drawing board"—sketching up a new concept on a low-angled drafting table—is the idiomatic source for a new idea. Yet one typically would use a vertically-oriented screen to present the same idea to others. The problem is that no fixed display angle is best across all activities. It depends on the task and situation. This motivates a relatively under-explored class of hybrid horizontal+vertical systems, particularly for displays that are continuously adjustable and self-stable (able to hold their position without a physical clutch or locking mechanism).

This emerging class of digital drawing boards offers an intriguing form-factor. For desktop displays, the Wacom Cintiq 22HD, Samsung Space Monitor, and Surface Studio offer examples of tilting screens. But an adjustable stand constrained to a single, stable degree of freedom is also suitable for tablets. For example, the "floating cantilever design" of the Apple Magic Keyboard stand lets you "smoothly adjust it to the perfect viewing angle". Yet, none of these devices offer a user experience that accommodates shifting display angles, if sensed at all, which is a lost opportunity to respond appropriately to the context-of-use, and thereby shift the burden of adapting the inputs, tools, modes, and UI layout from the user to the system. It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Each display posture—whether angled high, low, or somewhere in-between—affords some activities, but discourages others. What is appropriate further depends on the application and task. The present disclosure relates app-specific transitions between freeform vs. organized views, personal vs. public, shared task-space vs. person-space, reading vs. handwriting, and other nuances of input and feedback, contingent on display angle. Continuous responses provide interactive transitions tailored to each app.

Two techniques extend the expressiveness of tilt and are not specific to applications. First, at motion onset a Tilt Side-Channel fades in generic operations, such as clutching, that coexist with app-specific mappings of tilt. Second, a hybrid Tilt Transfer Function blends absolute vs. relative control for tilt. The present application discloses a range of application scenarios that how sensing display adjustments can drive context-appropriate transitions.

In accordance with examples of the present disclosure, methods and systems are provided that are directed to automatically adjusting a user interface based on tilt position of a digital drawing board. The digital drawing board has a tiltable screen with a sensor. The tiltable screen may be fixed in a stable tilt position. A sensor is used to determine that the digital drawing board has a first tilt position, which is an absolute position. The digital drawing board displays a first user interface associated with the first tilt position. The first user interface may be associated with a first use mode. The first user interface may also be based on an application running on the digital drawing board. When the sensor senses that the digital drawing board has moved from the first tilt position to a second tilt position, it automatically displays a second user interface associated with a second tilt position. The second user interface has different functionality than the first user interface. The second user interface may be associated with a second use mode that is different than the first use mode but may be based on the same application as the first user interface.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

Non-limiting and non-exhaustive examples are described with reference to the following Figures.

DETAILED DESCRIPTION

Figure 1:
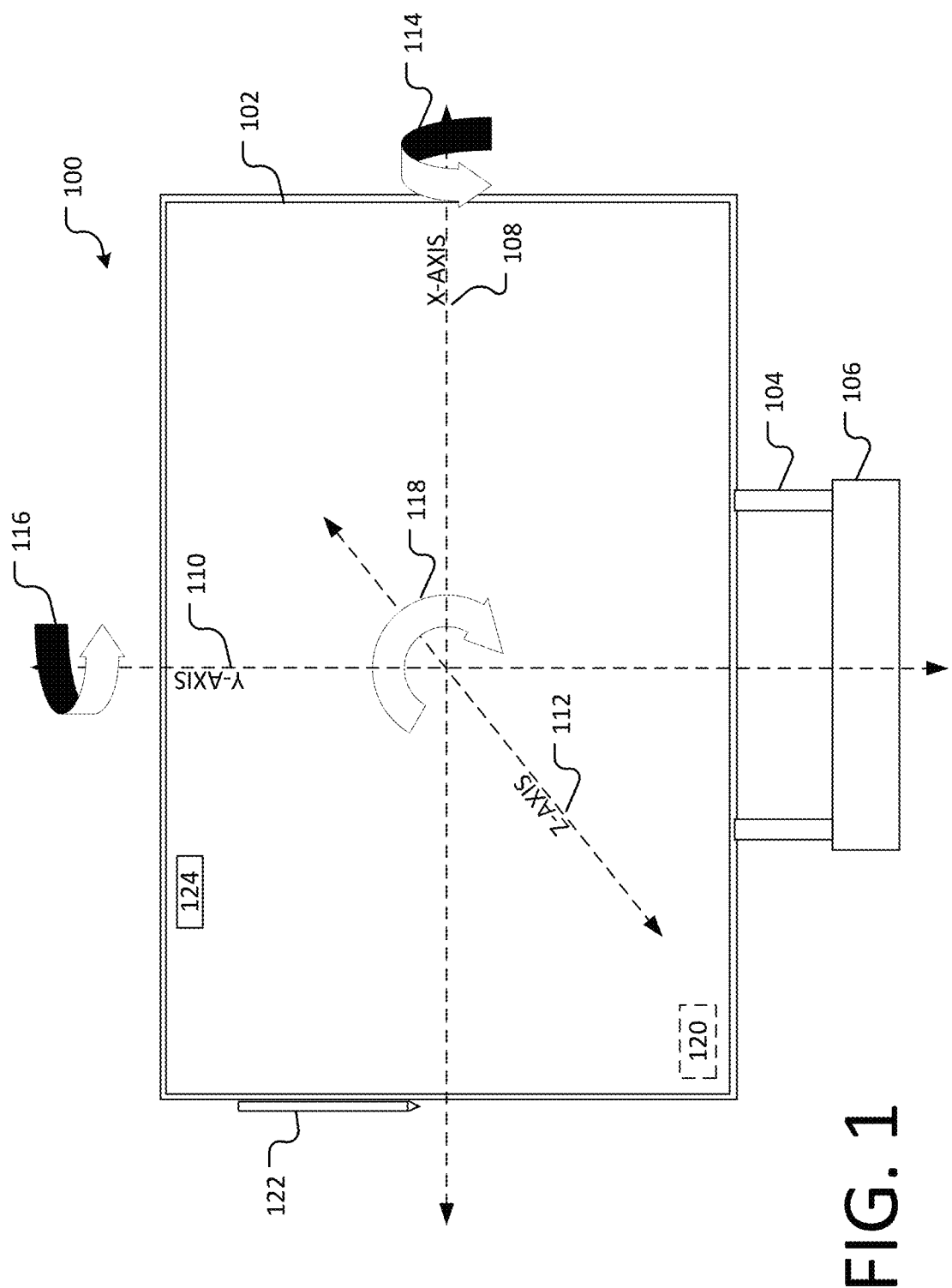
FIG. 1 shows details of a device, such as a digital drawing board, in accordance with examples of the present disclosure.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

The systems and methods described herein sense display postures for a device about at least one degree of freedom (e.g., tilt or rotation about the x-axis of a display) and the continuous transitions in-between. Although the discussion relates to rotation about one degree of freedom about the x-axis, this disclosure is not so limited. A device, such as a digital drawing board or a mobile computing device, is fitted with a number of sensors including a tilt (inertial motion) sensor, multi-modal inputs, including direct touch, pen, or bimanual pen+touch input, as well as an embedded front-facing camera. Various tilt-responsive interactions in a window manager shell hosts multiple experiences or use modes. These include automatic or semi-automatic (requiring some user confirmation) transitions based on tilt angle between public vs. private views, shared task vs. person-space in telepresence, reading vs. writing (handwritten annotations) in a word processor, authoring vs. presenting in a presentation program, and other changes in an application's task focus based on display angle. Each scenario shows how a digital drawing board could sense and respond to transitions in display posture. In aspects, the system might offer an option to choose whether automatic or semi-automatic transitions are the default. In still further aspects, the system might offer an option to turn off the tilt transitions, which might be particularly beneficial for mobile computing devices. Either way, the transition is gradual and moves as long as the tilt continues and stops when the tilt stops.

Input devices, tools and modes, or the layout of the interface can accommodate shifting display angle. For example, in the telepresence aspect, fading out the camera feed lets the user avoid unbecoming video angles as the display tilts. But it also selectively focuses the remote audience's attention on a shared document, rather than the video-feed.

These techniques inhabit a continuum between explicit foreground interactions driven by the user's intentional tilt motions, versus implicit background sensing techniques that automatically adapt interface behaviors in situations where the user needs to adjust the display angle anyway. Hence the most successful such techniques strike a balance between the effort used to adjust display tilt, versus the potential benefits resulting from the transition.

Taken together, the tilt-responsive application scenarios provide interaction techniques for continuously adjustable, self-stable, pen+touch digital drawing boards. These techniques demonstrate both discrete and continuous responses to changes in display angle. They also include techniques to extend the expressiveness of tilt, including a tilt side-channel to support system-wide responses to tilting motions that can coexist with app-specific mappings of tilt, as well as a tilt transfer function that allows precise responses to relative tilt changes, yet reverts to absolute orientation as appropriate.

FIG. 1 depicts details of an example device, such as a digital drawing board 100, in accordance with aspects of the present disclosure. Digital drawing board 100 has a tiltable display screen 102, a stand 104, and a computer system 106 (similar to that discussed in connection with FIG. 10). As used herein, the term "digital drawing board" means a computing device that contains one ore more adjustable display screen(s) 102 (one screen in shown in FIG. 1 and two screens are shown in FIGS. 6D and 6E) that allows the display screen 102 to tilt or rotate in at least one or multiple stable degrees of freedom. More specifically, as used herein the "digital drawing board" may tilt or rotate about an x-axis, a y-axis, or a z-axis as shown in FIG. 1. As used herein, the "digital drawing board" is stable in that it may remain fixed at one or more degrees of freedom. In aspects, applying a light but intentional force smoothly pivots the display screen 102 to a new angle. The display screen 102 holds its position when released but has sufficient internal friction and torque to hold the position when light force is applied, such as with a finger or stylus. The display screen contains an x-axis 108, a y-axis 110, and a z-axis 112. In some aspects, the display screen 102 is adjustable about a single degree of freedom, namely the x-axis 108 as shown by arrow 114. This allows the digital drawing board 100 to be "tilted" from a vertical position to a low angle position as shown in FIG. 2. Alternatively, or additionally, the digital drawing board 100 is adjustable about the y-axis 110 as shown by arrow 116. This allows the display screen 102 to rotate from side-to-side or right-to-left. Additionally or alternatively, the display screen 102 is adjustable about the z-axis 112 as shown by arrow 118, which allows it to rotate from portrait to landscape mode and back. An inertial motion sensor 120 automatically senses the adjustment, whether it is a tilt about the x-axis 108, or rotation about the y-axis 110 or z-axis 112. On devices with more than one possible degree of freedom, the system can determine which is the primary degree-of-freedom of motion and then latch onto that as indicating the type of transformation to make. Any type inertial measurement unit will work as a sensor, including without limitation, an accelerometer, a gyroscope, an optical encoder, and/or a magnotometer. In aspects the digital drawing board 100 has a stylus 122. In aspects, the digital drawing board 100 also has at least a front facing camera 124.

Figure 2A:
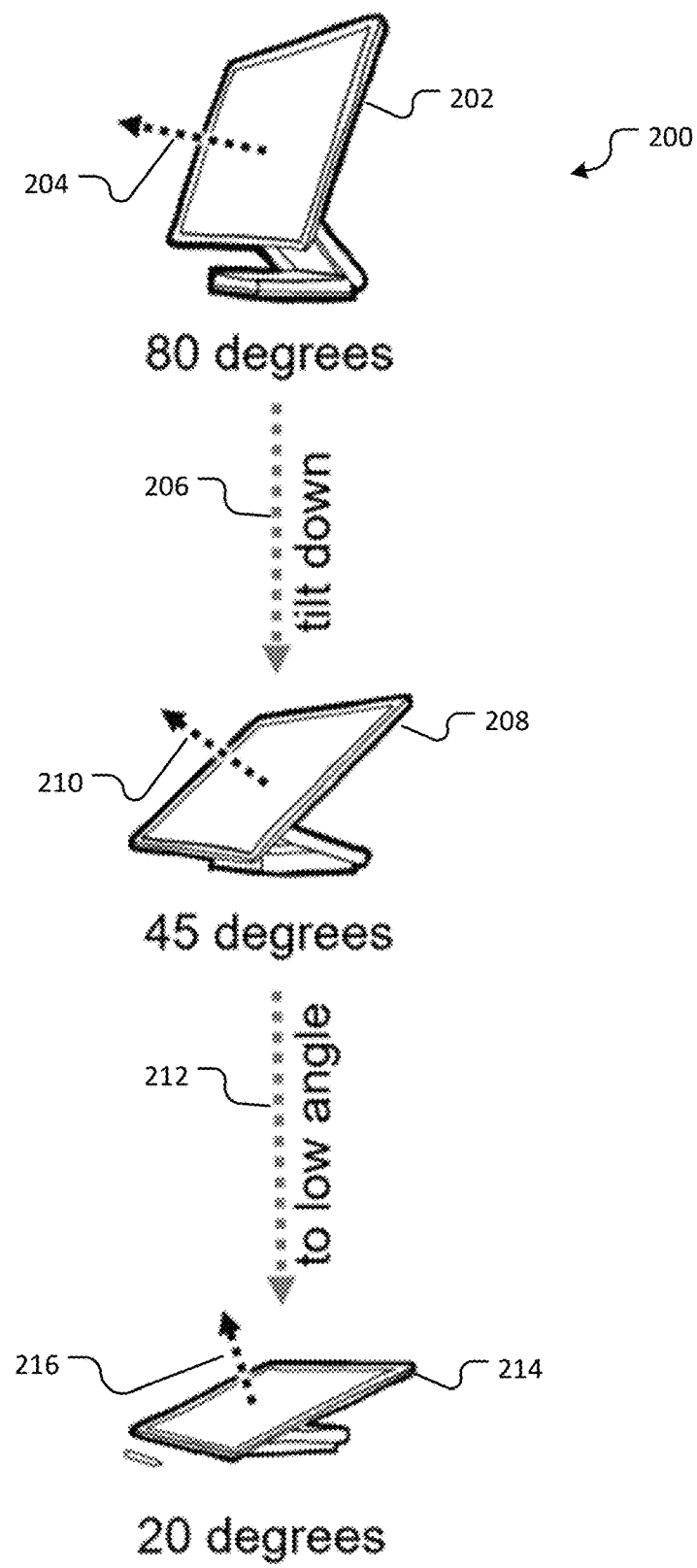
FIG. 2A depicts example tilt angles of a device in accordance with examples of the present disclosure.

FIG. 2A shows an example device, such as digital drawing board 200, in accordance with aspects of the present disclosure, which is adjustable about a single degree of freedom by tilting about the x-axis (not shown). At a vertical position 202, the z-axis 204 is at 80 degrees and the orientation of the digital drawing board 200 is a generally upright with a high or large angle. The position is stable in that it will not move on its own. Although shown at 80 degrees, the vertical position 202 involves a range of tilt positions and is not limited to 80 degrees. At 206, the digital drawing board 200 is tilted down to a middle position 208 such that the z-axis 210 is at 45 degrees. Although shown at 45 degrees, the middle position 208 involves a range of tilt positions and is not limited to 45 degrees. At 212, the digital drawing board 200 is further tilted down to a low angle position 214 such that the z-axis 216 is at 20 degrees and the display orientation is considered to be relatively flat or to have a low angle. Although shown at 20 degrees, the low angle position 214 involves a range of tilt positions and is not limited to 20 degrees. Although only three positions of the display are shown, it is noted that the display screen may be fixed in a stable position at any angle between slightly more than 90 degrees (fully vertical) and 0 degrees (fully flat).

Figure 2B:
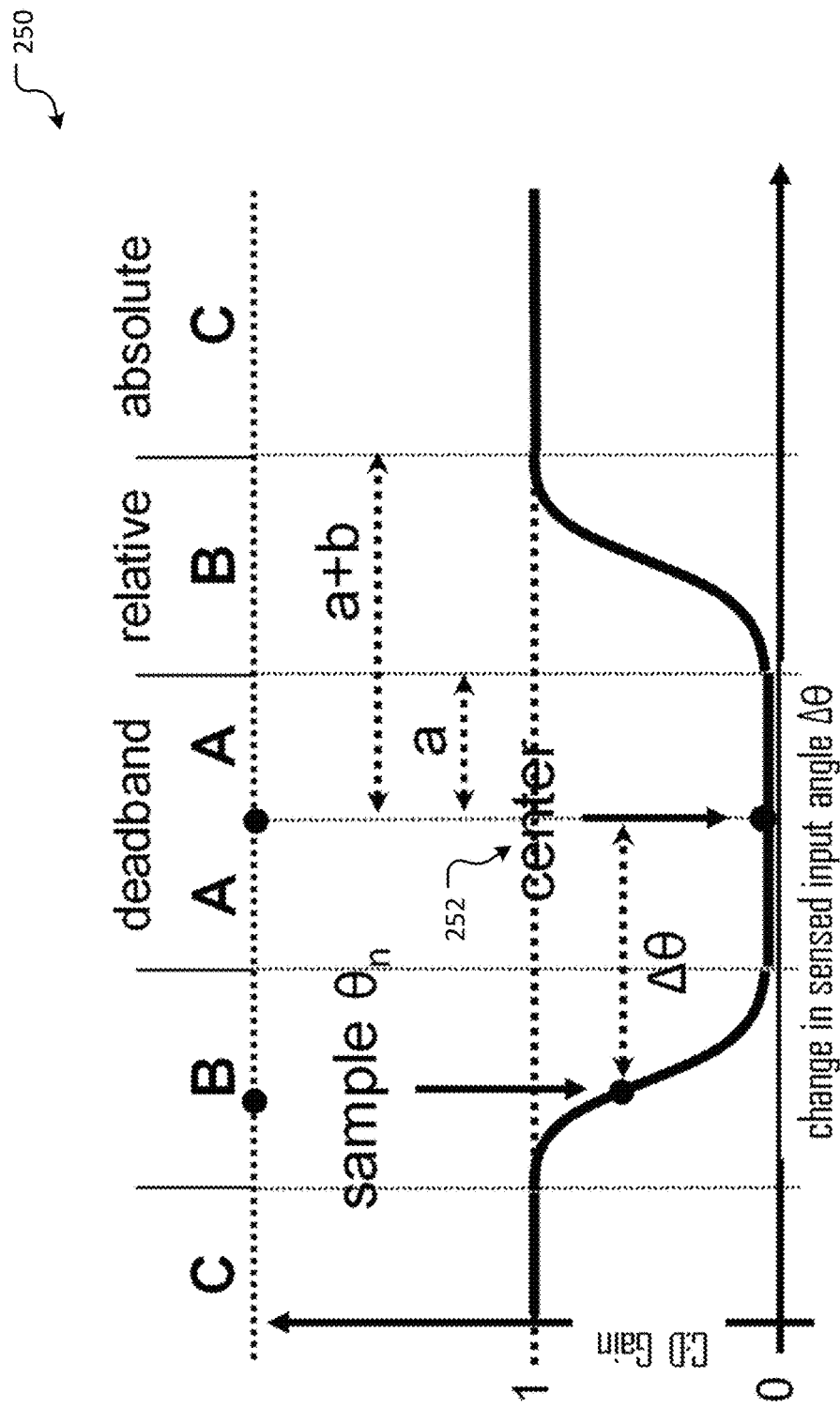
FIG. 2B illustrates details of the tilt transfer function in accordance with examples of the present disclosure.

FIG. 2B illustrates the tilt transfer function 250 in accordance with aspects of the present disclosure. Considered as an input device, a tilt sensor returns an absolute angle (as compared to the gravity of the Earth). In this way, the tilt sensor tracks absolute movement because it provides a 1:1 mapping between a point in the input or control space (i.e., the location of the sensor) and the output or display space (i.e., the display of the screen on the digital drawing board). Many aspects discussed in the present disclosure respond to transitions in this absolute value, such as moving from low angle position to vertical position. But for a stable continuous response, small tilt motions allow for precise control that is better provided by treating the tilt-sensor as a relative input device (e.g., a mouse). Relative input devices map displacement in the input or control space (i.e., the sensor) to displacement in the output or display space (i.e., the screen display). Control-Display Gain (or C:D gain) describes the proportion between movements in the control space to the movements in the display space. For example, relative input devices, such as a hardware mouse, may move at another speed or distance than the cursor on the screen. Even if these movements take place in two different spaces, the units for measurement have to be the same in order to be meaningful (e.g. meters instead of pixels). The CD gain refers to the scale factor of these two movements:

$$CD_{gain} = V_{display}/V_{control}$$

FIG. 2B maps the CD gain on the y-axis to the change in sensed input angle of the input sensor on the digital display board on the x-axis. In particular, the motor space of changes in tilt is divided into A, B, and C regions which apply a deadband, relative control, and absolute control, respectively. For purposes of this discussion, the absolute angle shall mean the value actually sensed by the input sensor. The virtual angle is the angle used by the display screen. The virtual angle used by the screen may or may not match the absolute angle. The input mapping works as follows. From an initial resting center 252 (at whatever absolute angle the may be), the sensed tilt angle moves away (in either direction). Within a region A close to this center 252, a deadband is applied, so the resulting (virtual) angle used by display screen (and applications displayed thereon) does not change. That is, when in the deadband zone although the absolute angle of the input sensor is changing, what is shown on the display is not changing. Hence the CD Gain is 0. There are several reasons for the deadband zone. First, there is a limit in the amount of precision of how much and how finely a human being can control the absolute tilt angle of the screen. At some point, the display on the screen should remain still if a user wants to lock the screen into a certain tilt position. Additionally, there is inherent sensor noise that might have a bit of jitter in the signal. It would be problematic if that jitter caused the screen display to change. Even further, there may be minor mechanical wobble in the tilt of the screen (and thus absolute tilt angle) that is also not something that should be shown on the display screen. In essence, the deadband zone filters out very fine, very small motions so that a user can lock in a desired tilt position (e.g., virtual tilt angle) with precision and confidence.

As the screen tilts into region B (meaning the change in absolute tilt angle changes beyond a threshold), a proportional gain yields enhanced control and the CD Gain increases. While the change in tilt angle is in the B zone, the input sensor is treated as a relative position input device. The greater the change in the absolute angle sensed, the more the CD Gain increases. The CD Gain changes smoothly in the B zone so that changes in relative control are continuous and smooth. In the B (or relative) zone, the CD gain is greater than 0 and less than 1. This means that greater changes in the absolute angle yield smaller changes in the virtual angle (the changes are not 1:1), which leads to enhanced control over what is shown on the display.

But if the screen tilts further away into region C (meaning the change in absolute tilt angle changes beyond a threshold), the virtual tilt angle re-centers by jumping to the absolute tilt angle, namely the absolute angle that is being returned by the sensor. The A/B/C regions also recenter whenever the virtual tilt angle remains in region B while the display is motionless (i.e. the change in tilt falls below a time-motion threshold) and whenever the tilt motion reverses direction.

```
//Time-weighted pre-filtering of raw (absolute) tilt sample
ω = 0.7; // weighting factor for past samples
θ_n = Absolute_Tilt_Sensor_Sample( );       //current raw sensor value
θ_n = ω * θ_{n-1} + (1.0 - ω) * θ_n;   // time-weighted pre-filter
a = 0.7; b=5.0; //radius of A and B regions; C region is > (a + b)
// θ is absolute tilt angle, S(θ) is stablized virtual tilt
Δθ = θ_n - center;   // delta from current center of A/B/C regions
S(θ)_n = {
    if |Δθ| < a   : S(θ)_{n-1};              // A: deadband, don't move
    if |Δθ| < (a+b): f(S(θ)_{n-1}, Δθ);       // B: relative, proportional gain
       if (moving==false)                    // < time-motion threshold?
           center = S(θ)_n;                  // recenter to relative tilt
    if |Δθ| ≥ (a+b): θ_n;                    // C: absolute mode
       center = θ_n;                         // jump center to absolute tilt
}
// Function f returns virtual tilt postion with ease in / ease out
// of gain based on proportion of distance (a+b) that Δθ represents.
define f(S(θ)_{n-1}, Δθ) {
    return S(θ)_{n-1} + Δθ * ease_in_ease_out(Δθ / (a+b), a+b);
}
```

Figure 3A:
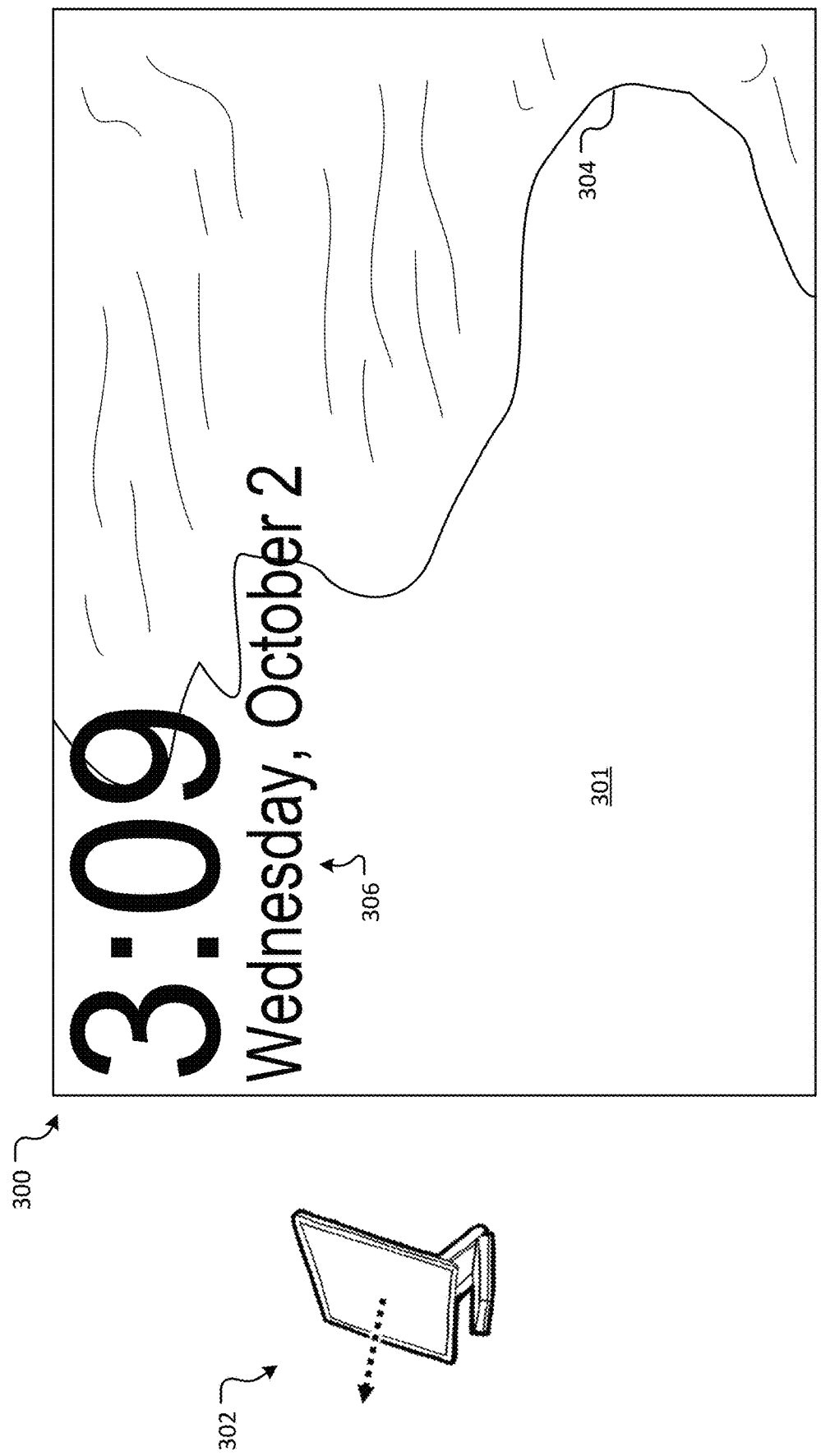
FIGS. 3A-3C illustrates a lock screen on a device at various tilt angles in accordance with examples of the present disclosure.
Figure 3B:
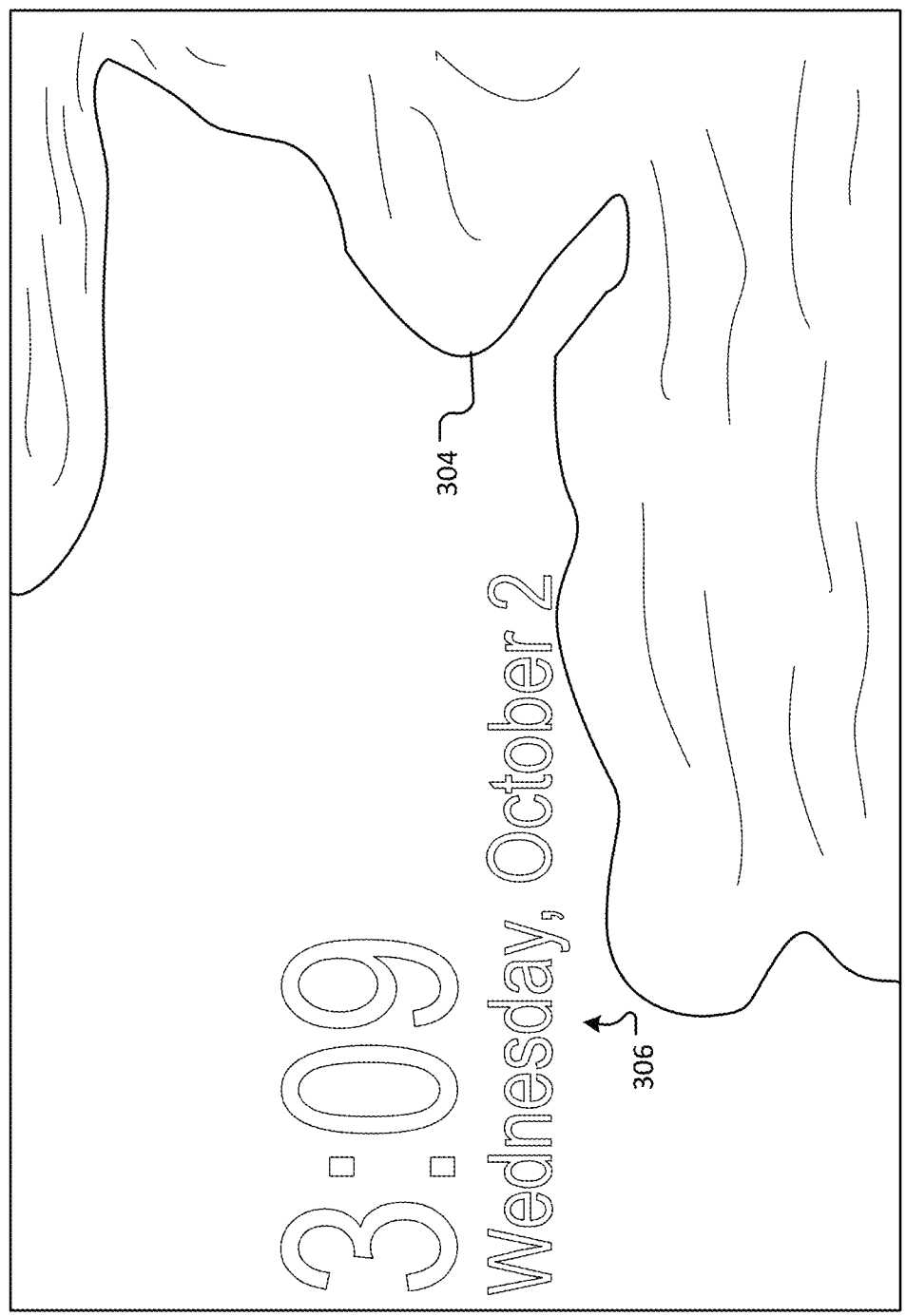
Figure 3B:
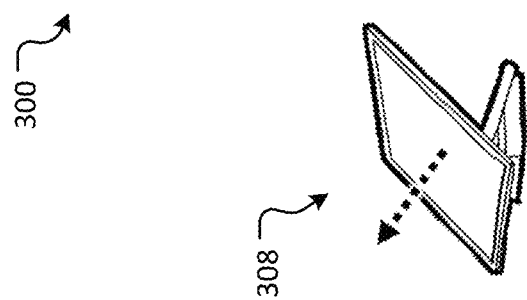
Figure 3C:
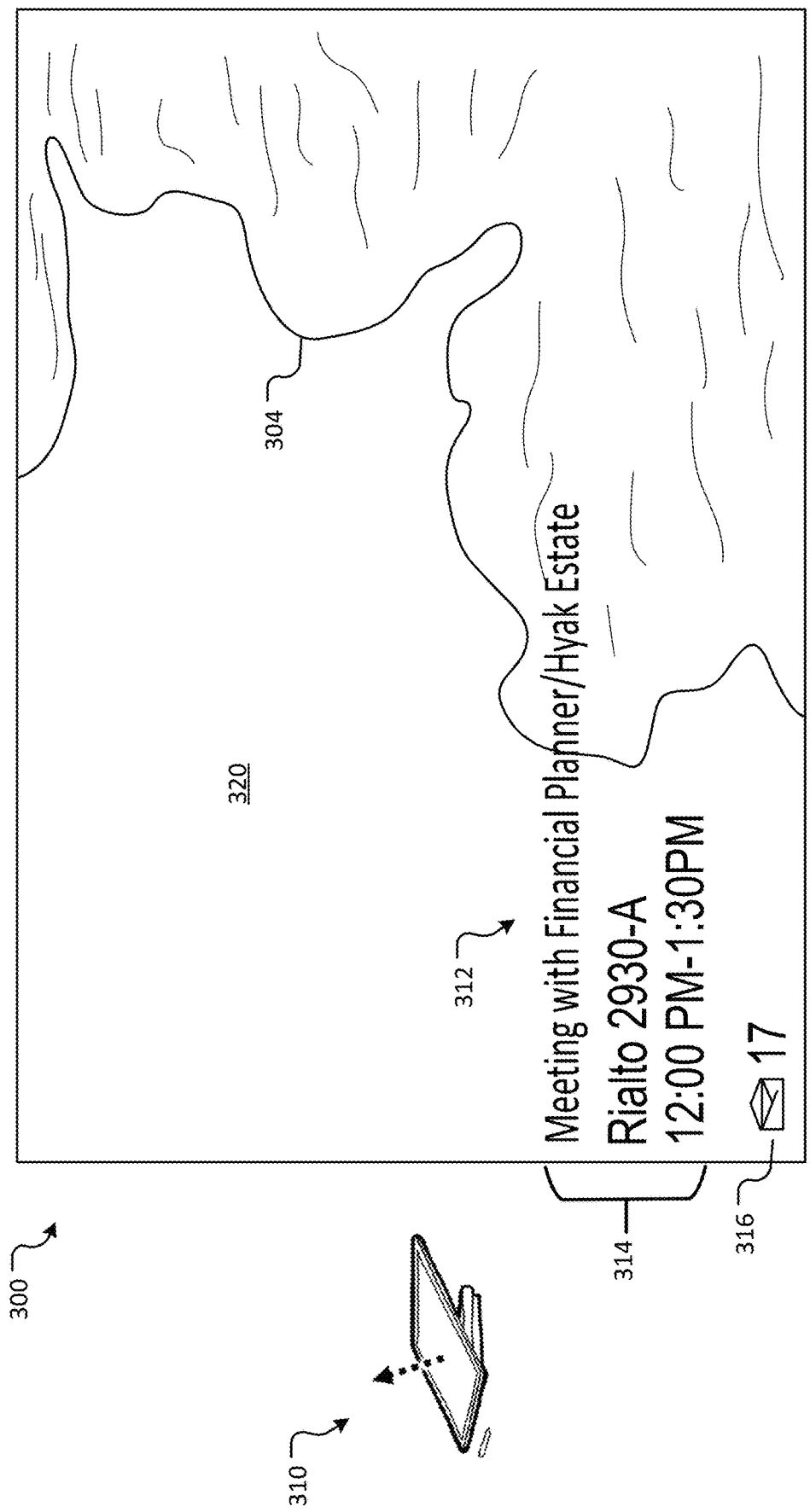

FIGS. 3A-3C illustrate a lock screen of a device, such as digital drawing board 300, in accordance with aspects of the present disclosure. FIG. 3A shows the digital drawing board 300 in a generally vertical position 302, FIG. 3B shows the digital drawing board tilted into a middle position 308, and FIG. 3C shows the digital drawing board 300 in a generally low angle position 310. In aspects, the digital drawing board 300 automatically transitions from a public use mode with a first user interface 301 in the vertical position 302 to a private use mode with a second user interface 320 in the low angle position 310 when tilted from the vertical position 302 to the low angle position 310. Likewise, the digital drawing board automatically transitions from the private use mode and second user interface 320 to the public use mode and first user interface 301 when tilted back from the low angle position 310 to the vertical position 302 as described below. In other aspects, the transition might be semi-automatic in that the system asks for a user confirmation before transitioning modes. For example, the system might reveal a suggestion to transition from private mode to public mode and the user can accept this suggestion by tapping on the suggestion on the screen. In other aspects, the system might offer an option to choose whether automatic or semi-automatic transitions are the default. In still further aspects, the system might offer an option to turn off the tilt transitions, which might be particularly beneficial for mobile computing devices. Either way, the transition from one use mode to the other is gradual and moves as long as the tilt continues and stops when the tilt stops.

In the vertical position 302, the background image 304 is a time-lapse video of a design (e.g., ink clouds in water). Although ink clouds are shown, one of ordinary skill in the art will appreciate that any design of any time-lapsed video may be shown as a background image 304. As the user tilts the device, the digital drawing board 300 displays individual video frames, forward or time-reversed, according to the current tilt. In aspects, the video frames are shown in forward time as the tilt goes from the vertical position 302 to the low angle position 310 and in reverse time as the tilt goes from the low angle position 310 to the vertical position 302. Adjusting the background image 304 in response to tilt reveals to a user the concept that images and other content and functionality on the digital drawing board 300 respond to tilt. Changes in the tilt position of more than a certain threshold (e.g., 20 degrees) cause the device to prompt the user to sign in and/or unlock the lock screen.

Additionally or alternatively, the lock screen of the digital drawing board 300 shows a private use mode in the vertical position 302 with public information 306 shown, such as the time/date. As the user starts to tilt the digital drawing board 300 down (e.g. lower the angle) towards the middle position 308 as shown in FIG. 3B, the public information 306 slides down with the design 304 and starts to fade away as illustrated by the outlined text. Then as the digital drawing board 300 reaches the low angle position 310 and a private use mode where private information 312 such as meeting notifications 314 (e.g., the specifics of a user's next meeting) and emails 316 are revealed. Tilting the digital drawing board 300 back up to the vertical position 302 shown in FIG. 3A reverses this sequence and starts to fade out personal and private information 312 while the public information 306 (e.g., time/date) rise back up, along with the time-lapse video of the background design 304.

Figure 4A:
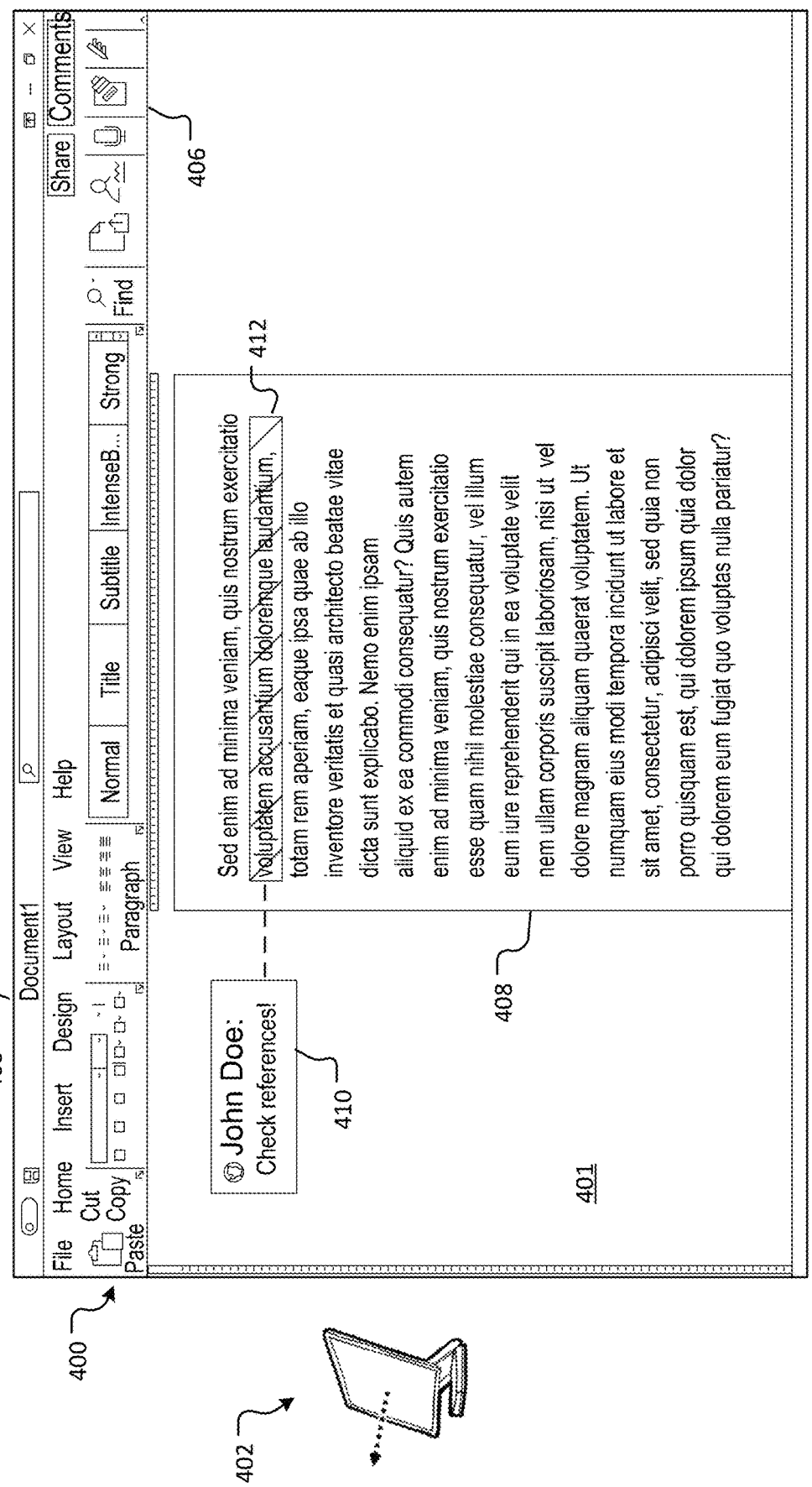
FIGS. 4A-4B illustrates a word processing application on a device at various tilt angles in accordance with examples of the present disclosure.
Figure 4B:
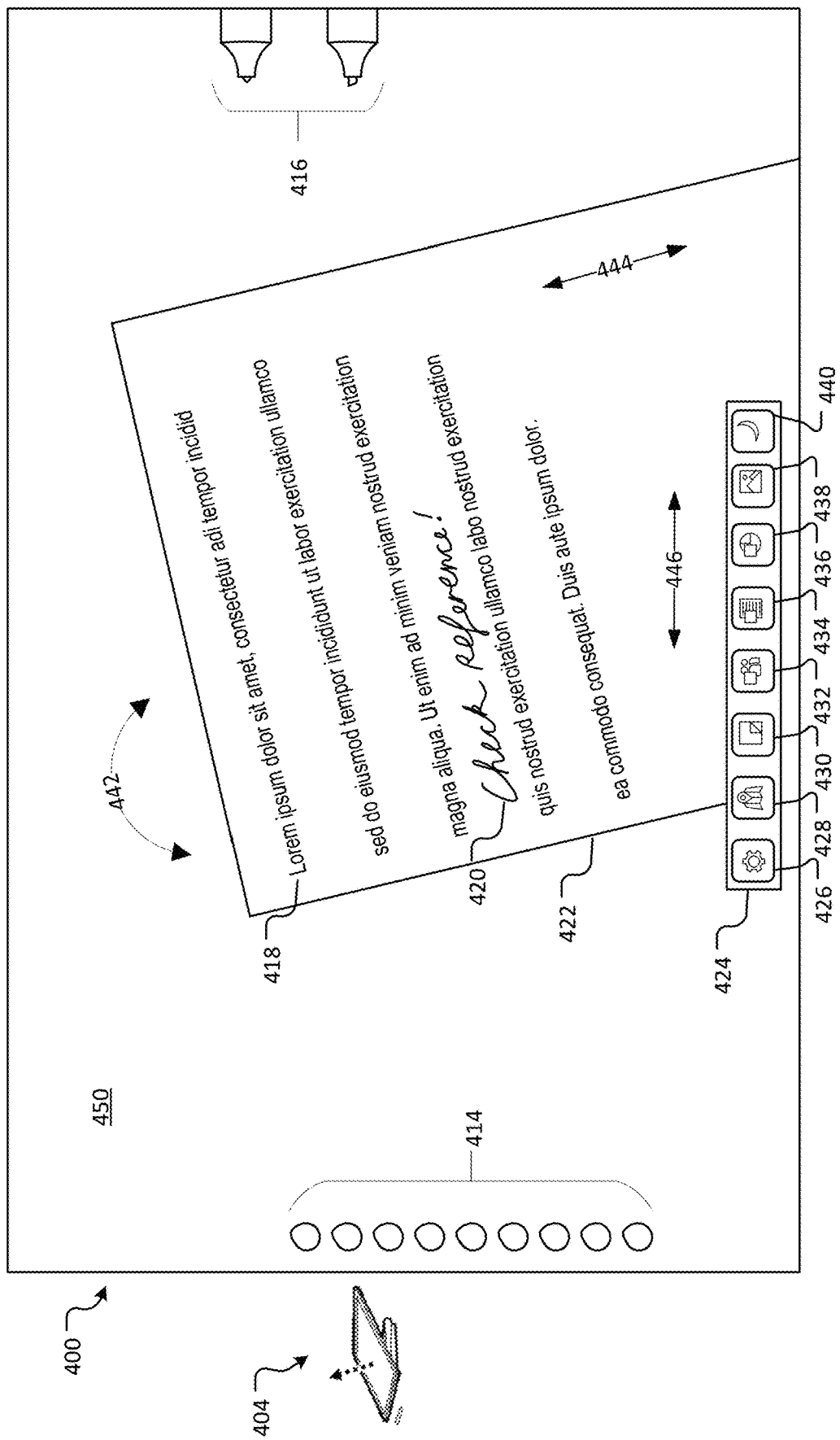

FIGS. 4A-4B illustrate a word processing application 403 of a digital drawing board 400 in accordance with aspects of the present disclosure. FIG. 4A shows the word processing application 403 of the digital drawing board 400 in a generally vertical position 402 and FIG. 4B shows the word processing application 403 of the digital drawing board 400 tilted into a generally low angle position 404. The word processing app 403 automatically or semi-automatically transitions from a writing or text edit use mode with a first user interface 401 in the vertical position 402 to an active reading or annotation use mode with a second user interface 450 in the low angle position 404 when tilted from the vertical position 402 to the low angle position 404. Likewise, the word processing app 403 automatically transitions from the active reading/annotation mode and second user interface 450 to the text edit use mode and first user interface 401 when tilted back from the low angle position 404 to the vertical position 402 as described below. The transition from one mode to the other is gradual and fluid and moves as long as the tilt continues and stops when the tilt stops.

In particular, the user can read and edit text with the digital drawing board 400 in the canonical "desktop" vertical position 402 as shown in FIG. 4A. In vertical position 402, the tools and toolbars 406 for a word processing application are automatically present. The document 408 appears in standard vertical alignment. In aspects, the document contains a comment 410 for a highlighted portion 412 of the text. In this vertical position 402, input such as comments and text edits are typically added using a mouse/keyboard (not shown).

Tilting the digital drawing board 400 down to the low angle position 404 shown in FIG. 4B causes several changes to automatically occur that make it easier for the user to handwrite or annotate with ink, directly on their document, from a convenient display posture. For example, the standard toolbar 406 at the top of the window disappears and pen tools 414 and 416 geared towards pen-based annotation then fade in along the edges of the digital drawing board 400, which affords bimanual thumb+pen interaction to switch pen modes. For example, pen tools 414 allow for color changes to the pen and pen tools 416 allow for changes to pen type. To make more room for ink-based mark-up, the spacing of the lines 418 automatically expands for the document 422 when transitioning to the low angle position 404 for annotation 420 between the typed lines 418. The user can pan the current document 422 via touch to access any parts pushed off-screen by this line expansion as shown by arrow 444. Further, in the low angle position 404, the user can naturally orient/angle a page with the non-preferred hand while handwriting as shown by arrow 442. Hence, at the low-angled display posture in the low angle position 404, users can manipulate the document with the nonpreferred hand, via multi-touch, to rotate the page to their preferred writing angle. But when going back to the vertical position 402, the document 408 rotates back to the canonical (non-rotated) reading orientation with original line spacing as shown in FIG. 4A. In aspects, tilting back the digital drawing board 400 down to the low angle position 404 again automatically re-orients the page to the user's previously set preferred writing angle.

Tilting the digital drawing board 400 back to vertical position 402 also causes in-line handwritten notes made in the low angle position 404 to be automatically converted to call-out comments, such as comment 410 in FIG. 4A. In aspects, the comments appear as original ink (not shown), but users can select to optionally convert handwritten notes to recognized text as shown with comment 410. Likewise, tilting the digital drawing board 400 back to the vertical position 402 causes the pen tools 414 and 416 to fade out and the standard tools and toolbar 406 to fade in at the top of the word processing application 403. All of the changes described are automatically triggered as the user tilts the digital drawing board 400 from the vertical position 402 to the low angle position 404 and back to the vertical position 402.

Shown at the bottom on FIG. 4B is tilt app toolbar 424 for the tilt-adjustable applications: desktop 426, maps 428, sticky notes 430, videoconference 432, document 434, present 436, photos 438, and sign out 440. In aspects, the tilt app toolbar 424 appears when the digital drawing board 400 is tilted to the low angle position 404 to make navigating by touch easier and more convenient for the user. In other aspects, the tilt app toolbar 424 also appears all the time and in all positions. In other aspects, the tilt app toolbar 424 appears if the screen moves and fades out as the screen stops moving.

Figure 5A:
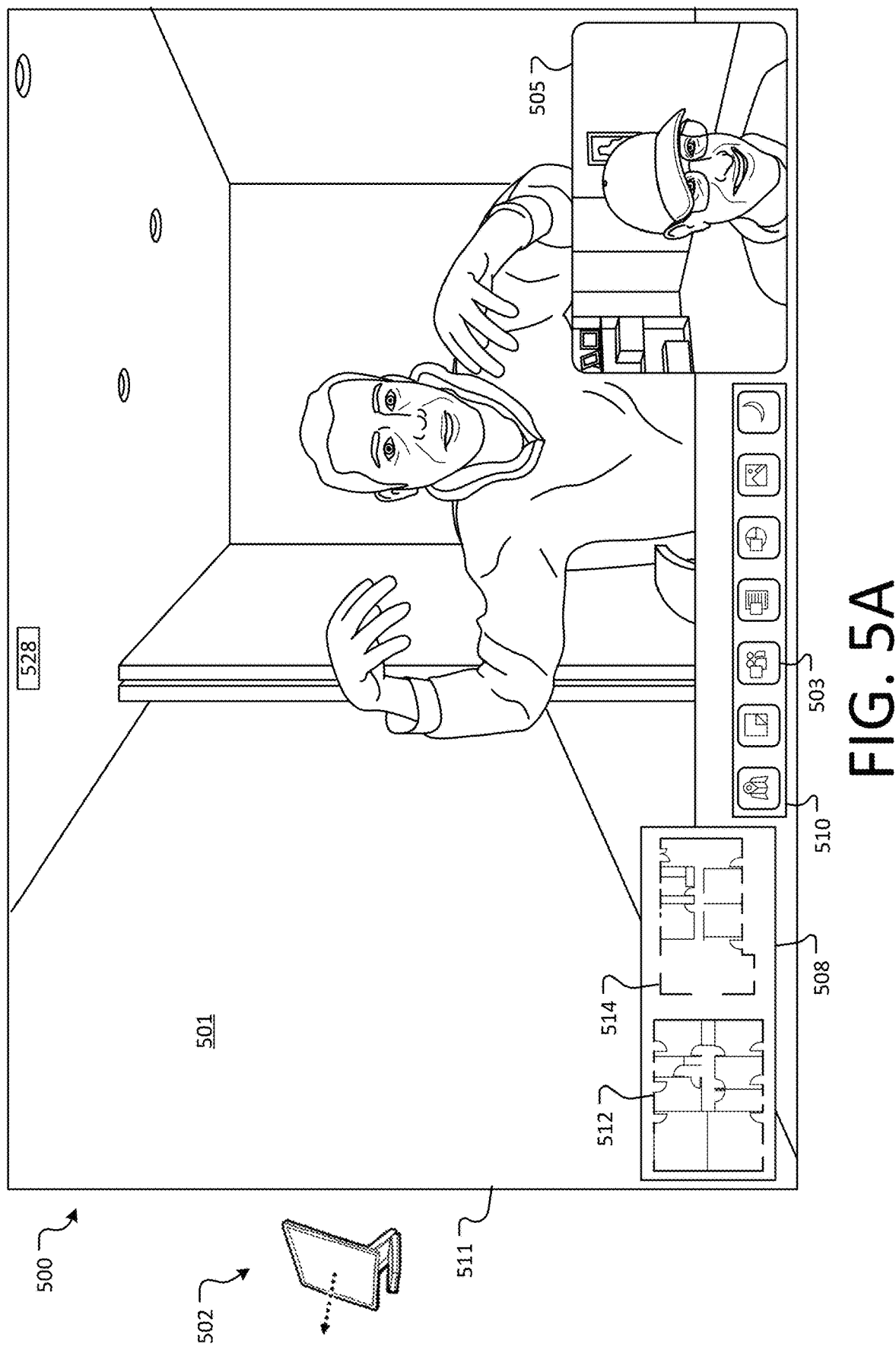
FIGS. 5A-5C illustrates a videoconferencing application on a device at various tilt angles in accordance with examples of the present disclosure.
Figure 5B:
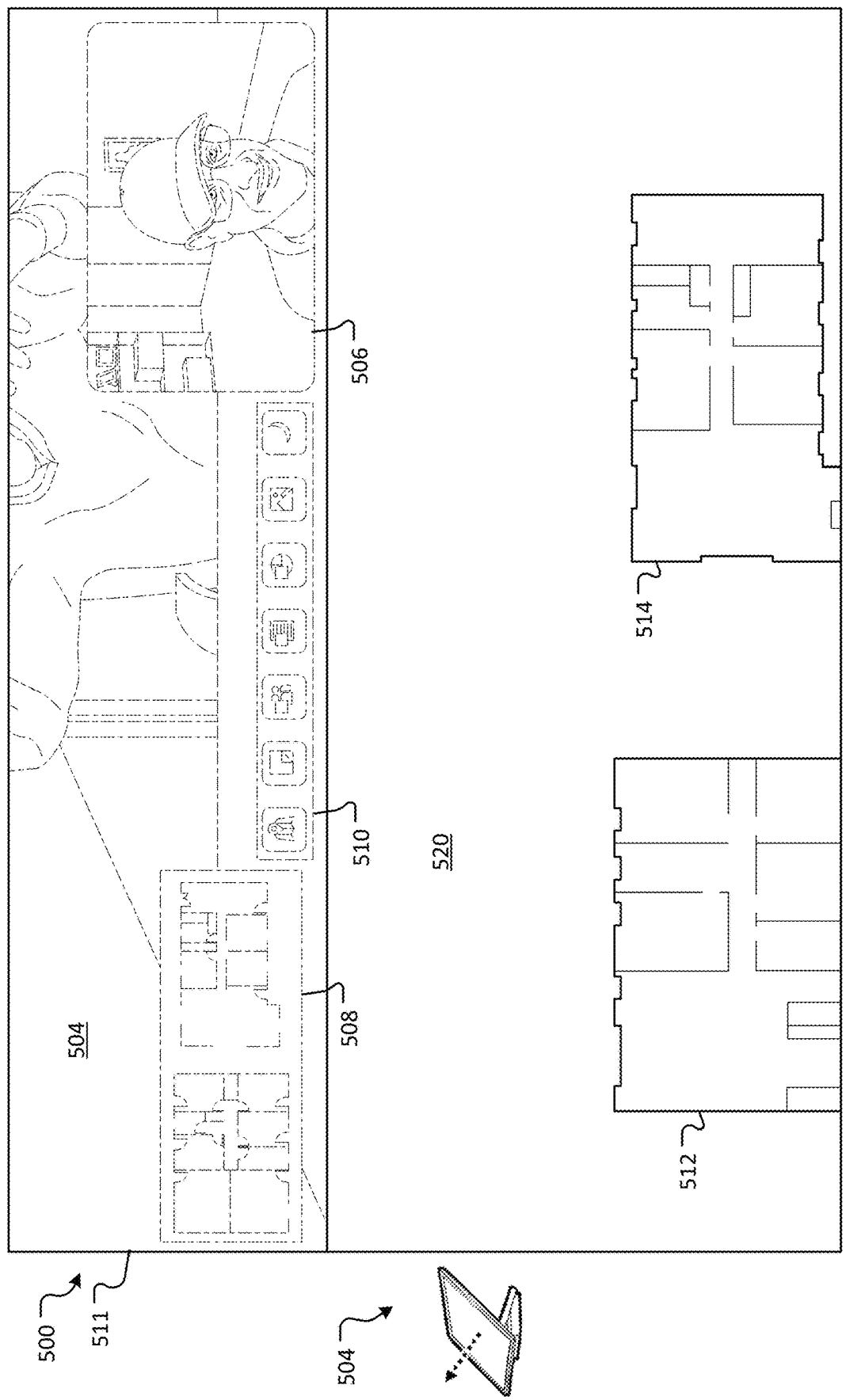
Figure 5C:
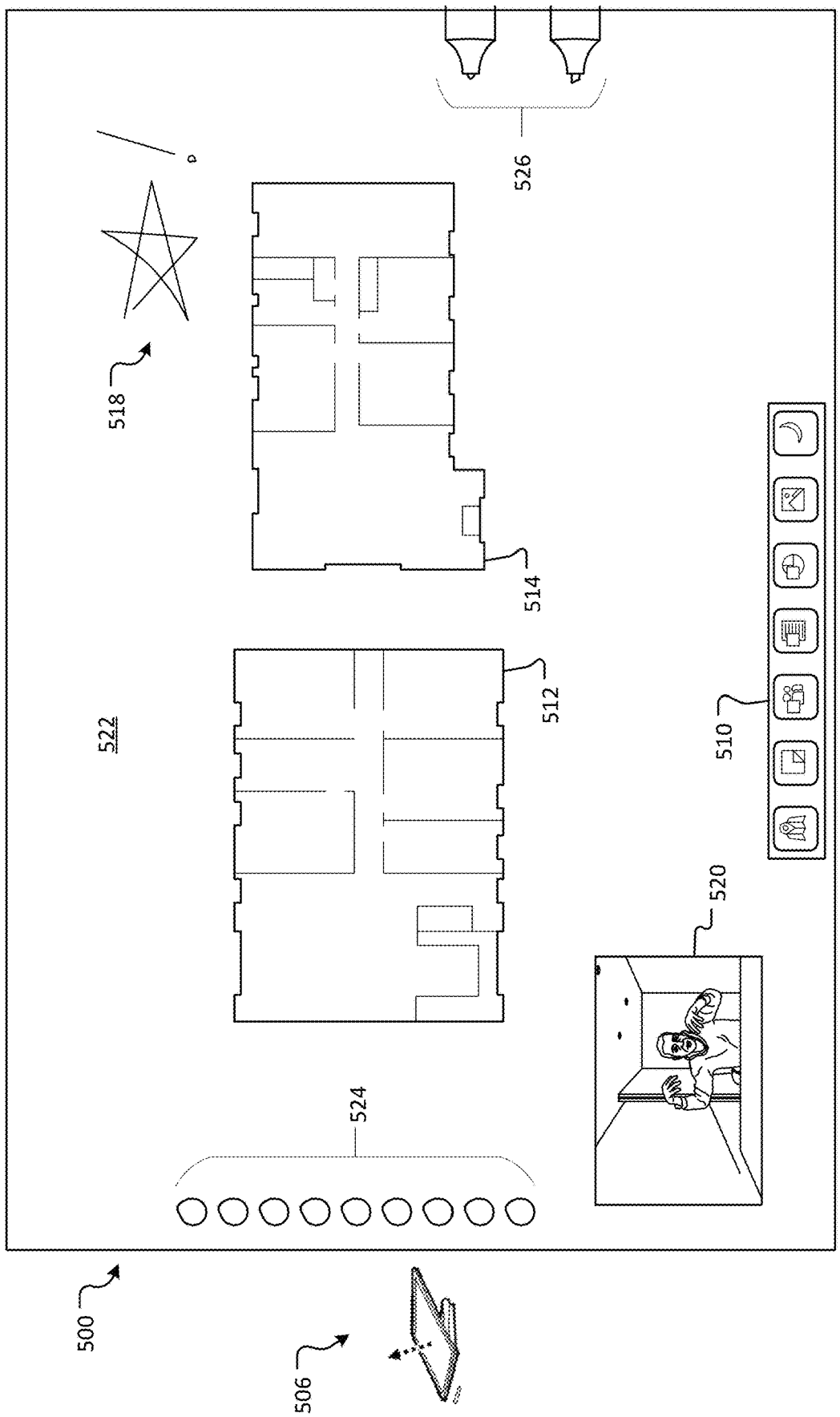

FIGS. 5A-5C illustrate a videoconference application 503 in accordance with aspects of the present disclosure. FIG. 5A shows the videoconference application 503 of the digital drawing board 500 in a generally vertical position 502, FIG. 5B shows the digital drawing board 500 in a generally middle position 504, and FIG. 5C shows the videoconference application 503 of the digital drawing board 400 tilted into a generally low angle position 506. In the vertical position 502, the videoconference application 503 of the digital drawing board 500 is in the person use mode with a first user interface 501. It automatically transitions to a task use mode with second user interface 522 comprising a task space when the digital drawing board is tilted to a low position 506 as shown in FIG. 5C. The digital drawing board 500 transitions back to first user interface 501 and the person use mode when tilted back to the vertical position 502.

When in the vertical position 502, the first user interface emphasizes a person use mode where the focus is on the video streams of the participants. The first user interface 501 comprises video stream 511 from the front facing camera 528 of the active participant with one or more windows 505 showing video streams of the other videoconference participants. In aspects, another window may show a screen 508 with documents 512 and 514 of interest to the videoconference. Tilting the digital drawing board 500 down then automatically transitions to task use mode and second user interface 522, where the user can mark-up a shared document or use a whiteboard. This embodies the two spaces in a direct physical motion, allowing users to switch between person vs. task mode in a way that minimizes disruption to the conversation itself. Unlike conventional systems, the user does not need to select a heavyweight mode entered via a command such as share screen or share document. Rather, the documents 512 and 514 are automatically shared with other videoconference participants (e.g. shown in window 505) via tilting the screen from vertical position 502 to low angle position 504. In some embodiments, if no documents are selected, then by default a blank shared whiteboard is shared in task mode. In other embodiments, screen sharing is the default in this case. In addition, the user may indicate their preferred default option for sharing, or respond to a system prompt to pick between various sharing options, upon transition to task mode.

Tilting to the low angle position 506 shown in FIG. 5C causes pen tools 524 and 526 to appear and allows for easy mark-up 518 of shared documents via a stylus/pen at a low screen angle. But as they users tilt the screen away from vertical position 502, the front-facing camera moves off-kilter with it. Users then find themselves streaming an unbecoming camera angle to their audience. Hence, as the camera moves off-kilter, the camera image 511 starts to fade out the camera feed as shown in FIG. 5B—and partially or completely hides it (as shown in FIG. 5C) before the user tilts the screen all the way to the low angle position 506 for mark-up. Likewise, remote participants see this camera feed fading away in corresponding fashion.

As the user tilts the digital drawing board 500 away from the vertical position 502, the shared documents 512 and 514 (or a blank shared whiteboard or screen sharing) expand to fill most of the screen as shown in the transition from FIG. 5B to FIG. 5C. This lets the user adjust the screen tilt to dynamically steer the focus of a remote audience's attention onto their mark-up of the shared document, or back to the face-to-face conversation, as the topic and situation require. In aspects, video streams of the other participants are shown in window(s) 520 even in the low angle position 506.

Figure 6A:
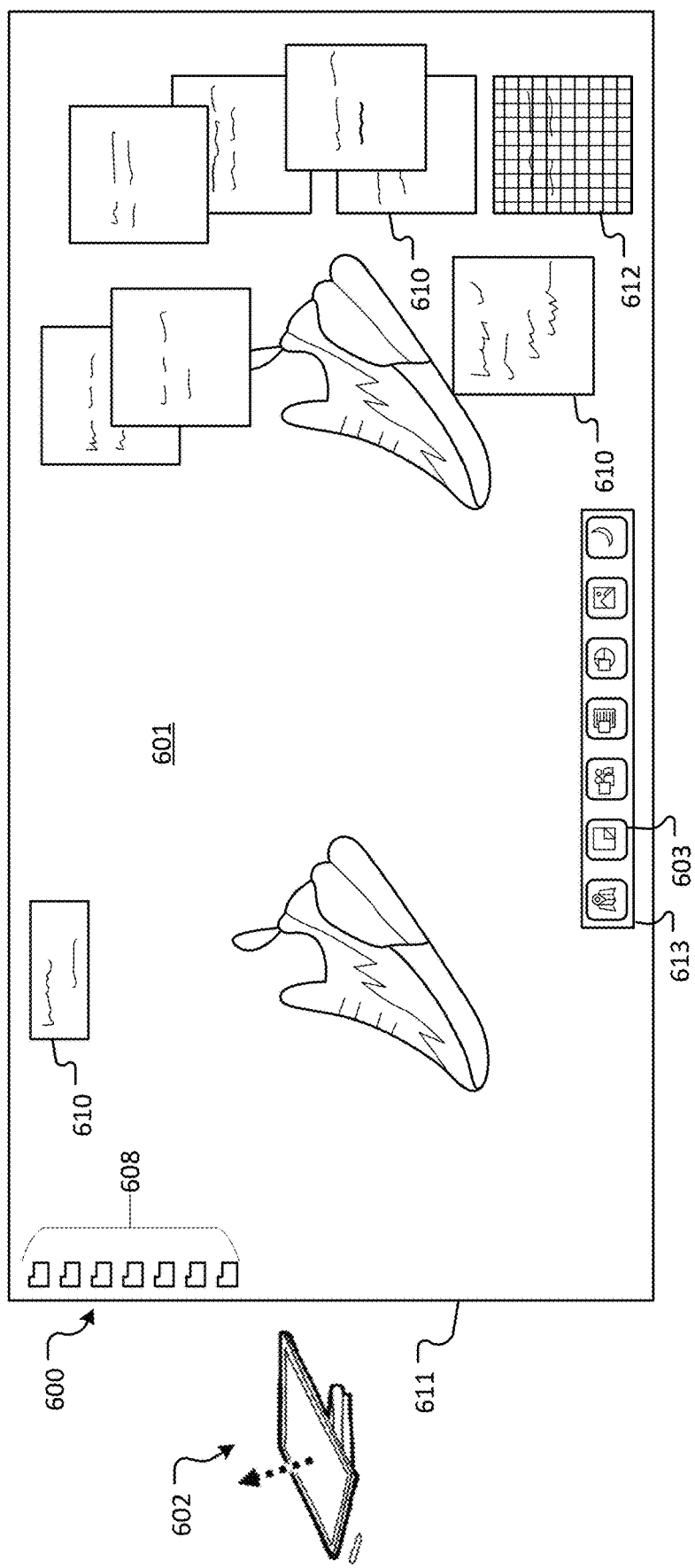
FIGS. 6A-6C illustrates a desktop with a sticky notes application at various tilt angles in accordance with examples of the present disclosure.
Figure 6B:
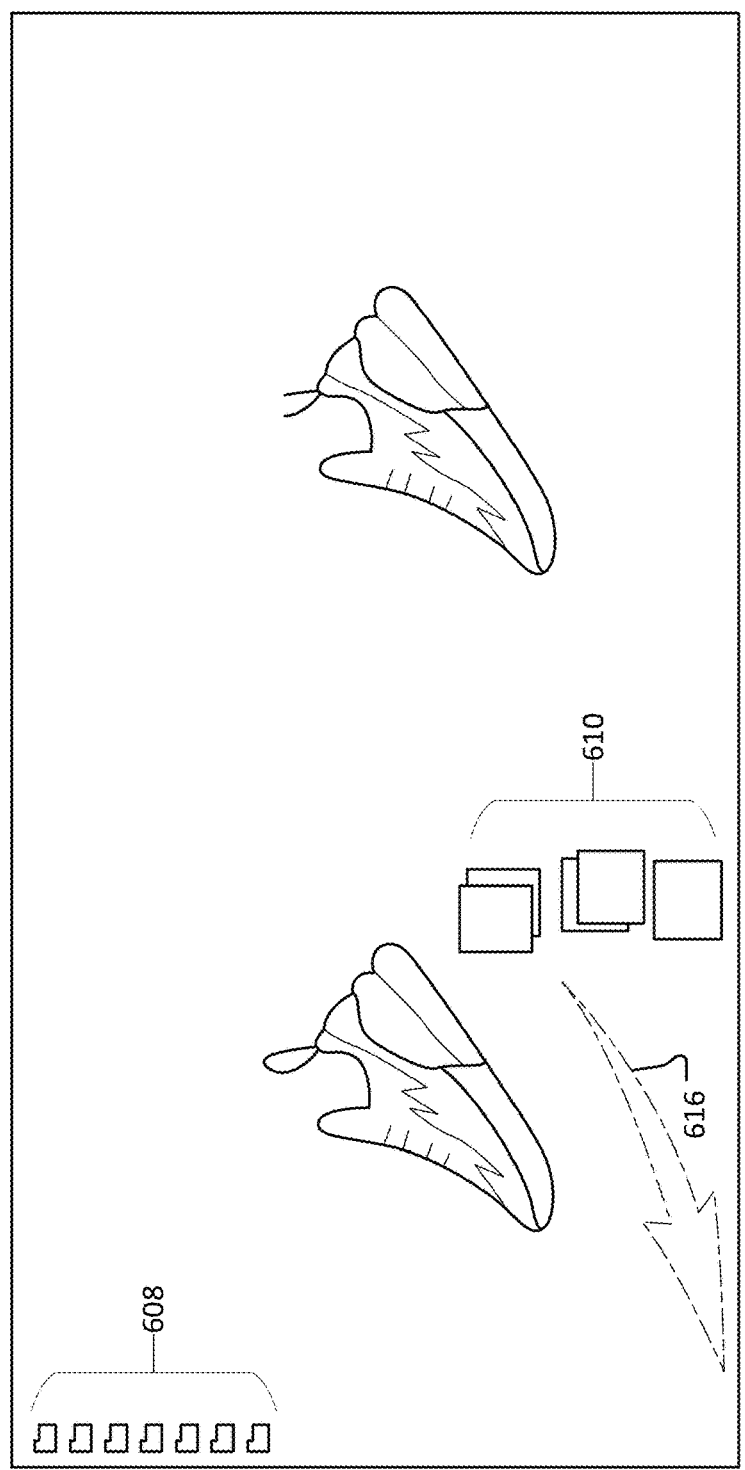
Figure 6C:
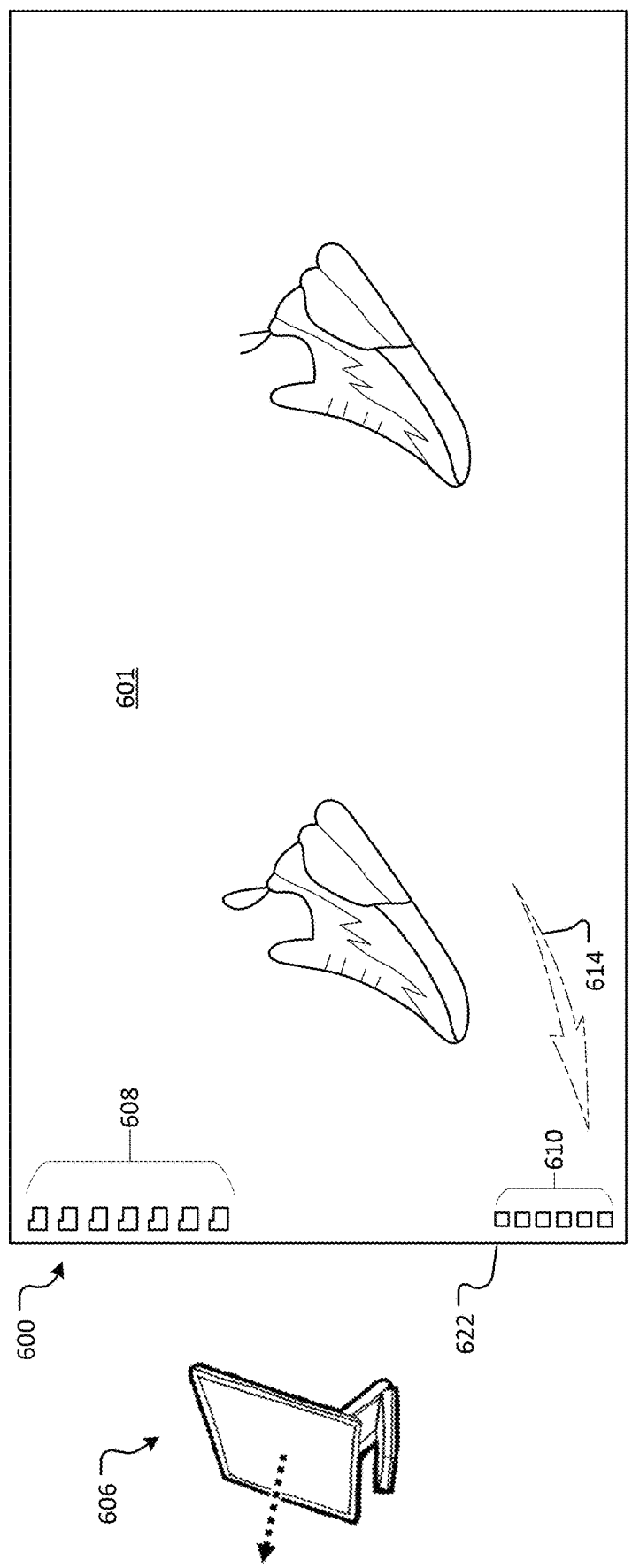
Figure 6D:
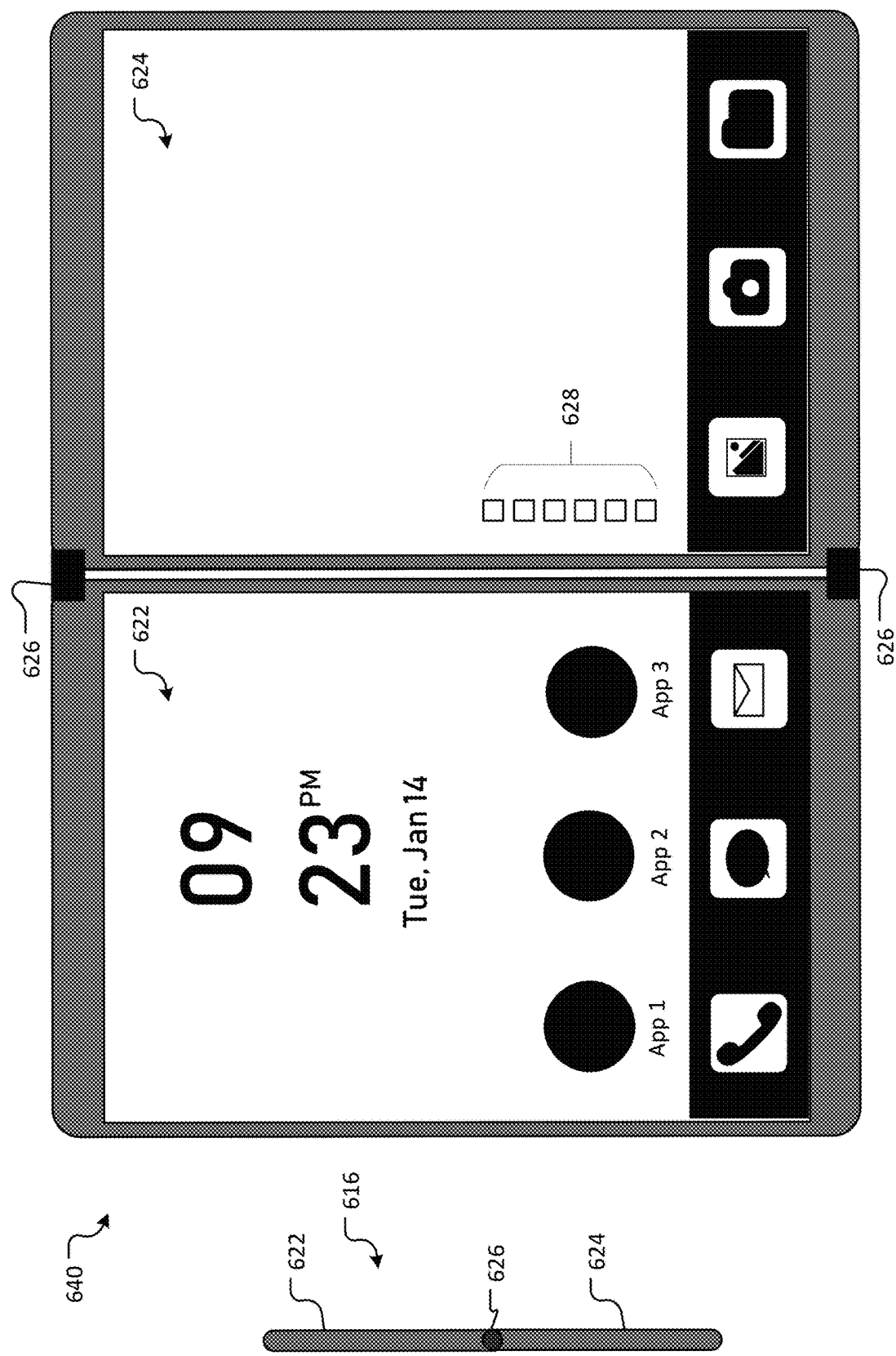
FIGS. 6D-6E illustrate an alternate aspect of the sticky notes application at various tilt angles in accordance with examples of the present disclosure.
Figure 6E:
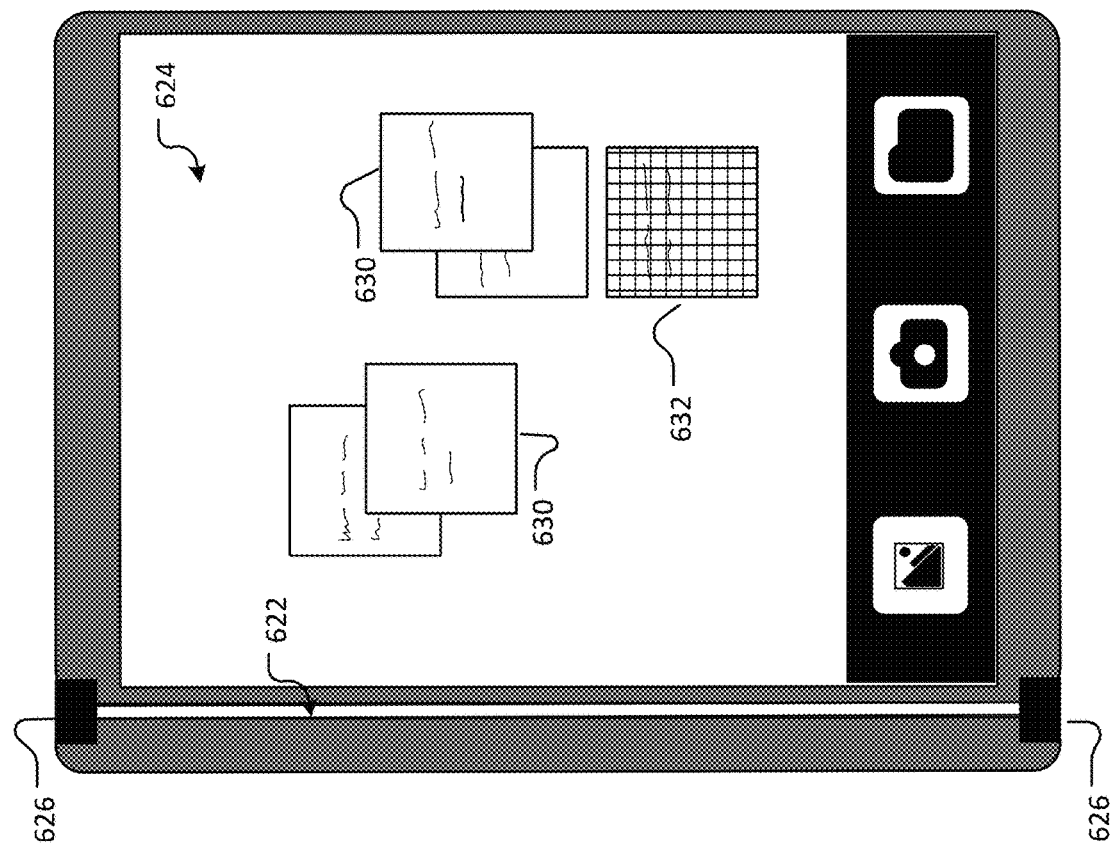
Figure 6E:
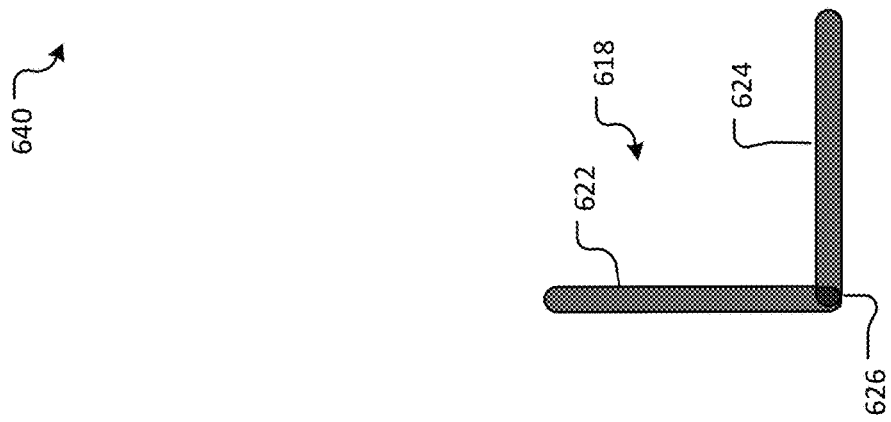

FIGS. 6A-6C show the sticky notes application 603 on the desktop 601 user interface in accordance with aspects of the present disclosure. FIG. 6A shows the desktop 601 of the digital drawing board 600 in a generally low angle position 602, FIG. 6B shows the digital drawing board 600 in a generally middle position 604, and FIG. 6C shows the desktop 601 of the digital drawing board 600 tilted into a generally vertical position 606. In the low angle position 602, the desktop 601 of the digital drawing board 600 is in the public use mode with a first user interface 611, which automatically transitions to a private use mode with second user interface 622 when the digital drawing board is tilted to a vertical position 606 as shown in FIG. 6C. The digital drawing board 600 transitions back to first user interface 611 and the public use mode when tilted back to the low angle position 602. The desktop 601 has icons 608 representing files, applications, documents etc. Further, the tilt app toolbar 613 is located at the bottom of the desktop user interface 611.

The desktop 601 is in private use mode when in the low angle position 602. The sticky notes application 603 provides a space for handwritten information-scraps where, in the low angle position 602, the user can jot notes on different colored virtual sticky notes 610 and 612. In aspects, certain colored sticky notes 612 are personal and private. These sticky notes 610 and 612 can be left lying around the screen, like a messy desk. The digital drawing board 600 may be automatically converted to a public use mode with a second user interface 622 by tilting to the vertical position 606 as shown in FIG. 6C. This automatically tidies up this information-scrap space, and hides personal information, making the display more suitable for public or semi-public viewing by others. The personal sticky notes 612 quickly fade away while the other sticky notes 610 animate and move as shown by arrow 616 in FIG. 6B to a small and tidy thumbnail view to a side of the screen in the second user interface 622 as shown in FIG. 6C. The user can later tilt the display back to the low angle position 602 to automatically revert to the "messy" layout or first user interface 611. Alternatively, the private use mode with first user interface 611 may not automatically return upon a tilt to the low angle position 602, but may require a user selection to cause such a transition. In aspects, the private use mode with the first user interface may start to fade in (such as sticky notes 610 shown in FIG. 6B) but give the user the option to stop the private information from fully appearing even though the screen is being tilted toward the private use mode.

FIGS. 6D-6E show the sticky notes application 603 on the device 640 with a dual screen digital drawing board having two tiltable screens 623 and 624 connected by a hinge 626 in accordance with aspects of the present disclosure. FIG. 6D shows the device 640 in a generally low angle position 616, FIG. 6E shows the device 640 in a generally folded position 618. The screens 623 and 624 each have orientation sensors that allow for sensing the tilt of each screen with respect to the other. In aspects, a flex sensor, optical encoder, or the like may be used to directly measure the angle between the two screens. Depending on the orientation of the device, this type of sensor can help to disambiguate the relative posture of the screens. For example, if the device is placed perfectly vertically on a desk (like a standing book), then it is difficult to correctly measure the angle between screens using only the orientation sensors in each screen. In the low angle position 616, the device 640 is in the public use mode with a first user interface, which automatically transitions to a private use mode with second user interface when the device 640 is tilted to a folded position 618 as shown in FIG. 6E. The device 640 transitions back to first user interface and the public use mode when tilted back to the low angle position 616. Although the sticky notes application is shown with the dual screen device, the present disclosure is not so limited. Any of the applications and aspects described herein will work on the dual screen device as they do on the digital display screen device.

As shown in FIG. 6E, the device 640 is in private use mode when in the folded position 618. The sticky notes application provides a space for handwritten information-scraps where, in the folded position 616, the user can jot notes on different colored virtual sticky notes 630 and 632. In aspects, certain colored sticky notes 632 are personal and private. These sticky notes 630 and 632 can be left lying around the screen 624, like a messy desk. The device 640 may be automatically converted to a public use mode with a second user interface by tilting to the low angle position 616 as shown in FIG. 6D. This automatically tidies up this information-scrap space, and hides personal information, making the display more suitable for public or semi-public viewing by others. The personal sticky notes 632 quickly fade away while the other sticky notes 630 animate and move to a small and tidy thumbnail view 628 to a side of the screen in the second user interface as shown in FIG. 6D. The user can later tilt the display back to the folded position 6618 to automatically revert to the "messy" layout or first user interface.

Figure 7A:
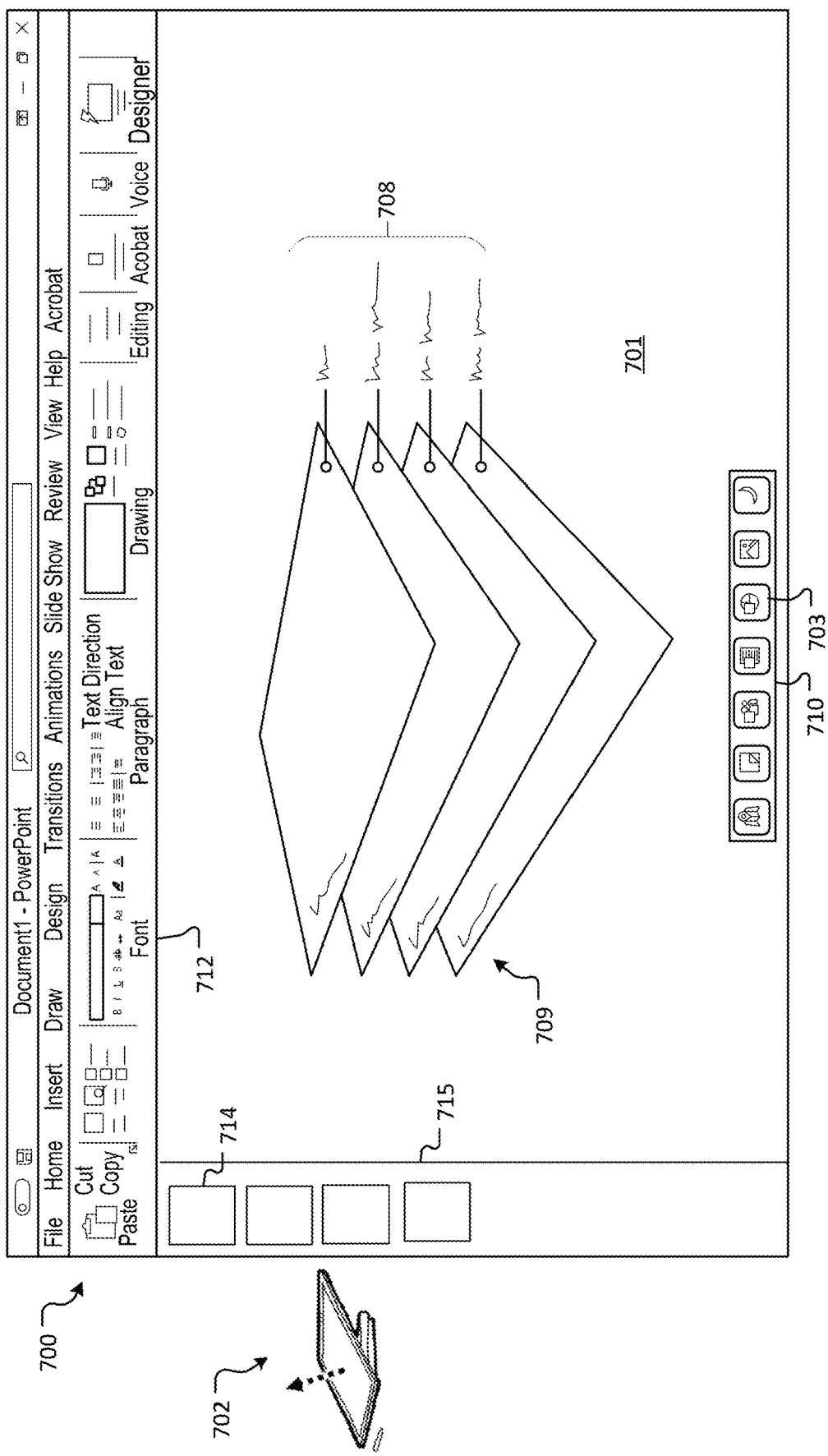
FIGS. 7A-7B illustrates a presentation application on a device at various tilt angles in accordance with examples of the present disclosure.
Figure 7B:
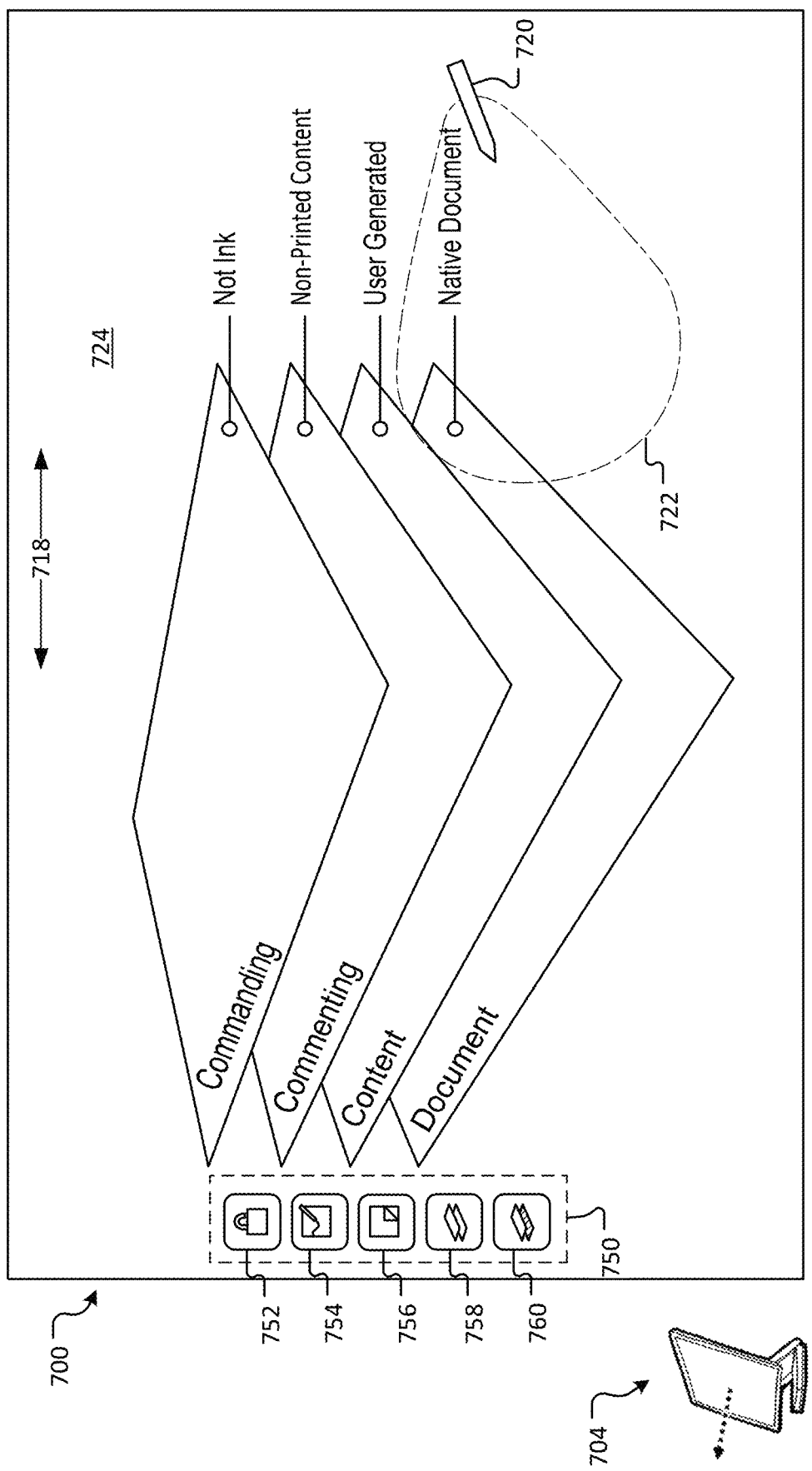

FIGS. 7A-7B show the presentation application 703 in accordance with aspects of the present disclosure. FIG. 7A shows the presentation application 703 of the digital drawing board 700 in a generally low angle position 702 and FIG. 7B shows the presentation application 703 of the digital drawing board 700 in a generally vertical position 704. In the low angle position 702, the presentation application 703 of is in the authoring use mode with a first user interface 701, which automatically transitions to a presentation use mode with second user interface 724 when the digital drawing board is tilted to a vertical position 706 as shown in FIG. 7B. The digital drawing board 700 transitions back to first user interface 701 and the authoring mode when tilted back to the low angle position 702. The presentation application provides an example where the intended use of the software—authoring or presenting—can shift with the display orientation.

In the authoring mode of the low angle position 702, the tools and toolbars 712 are located at the top of the user interface 701. The slide thumbnails 714 are located in a pane 715 on the side of the user interface 701. The current slide 709 being edited is located in the middle of the user interface. In the low angle position 702, when authoring, the user can employ the pen to make annotations 708 (e.g., private notes or mark corrections) directly on the slides.

When the digital drawing board 700 is tilted to the vertical position 704, the authoring mode and first user interface 701 automatically transition to presentation mode and second user interface 724. These handwritten annotation marks 708 disappear when the screen angles up for presenting, and the unmarked slide expands to fill the display. In this presentation view, swipe gestures flip through the slides via direct touch as shown by arrow 718. The pen 720 also changes roles, acting as a spotlight tool 722 to call out details or otherwise direct a colleague's attention to particular portions of the slide. The user can point the pen 720 in different directions to cast the spotlight on the desired area of the screen, proportional to the pen tip's angle and pressure. The spotlight effect fades out quickly when the user moves the pen 720 away from the screen. When the user tilts the digital drawing board 700 back to the low angle position 702, the use mode automatically transitions back to the authoring use mode and first user interface 701. The handwritten annotations 708 reappear.

Figure 8:
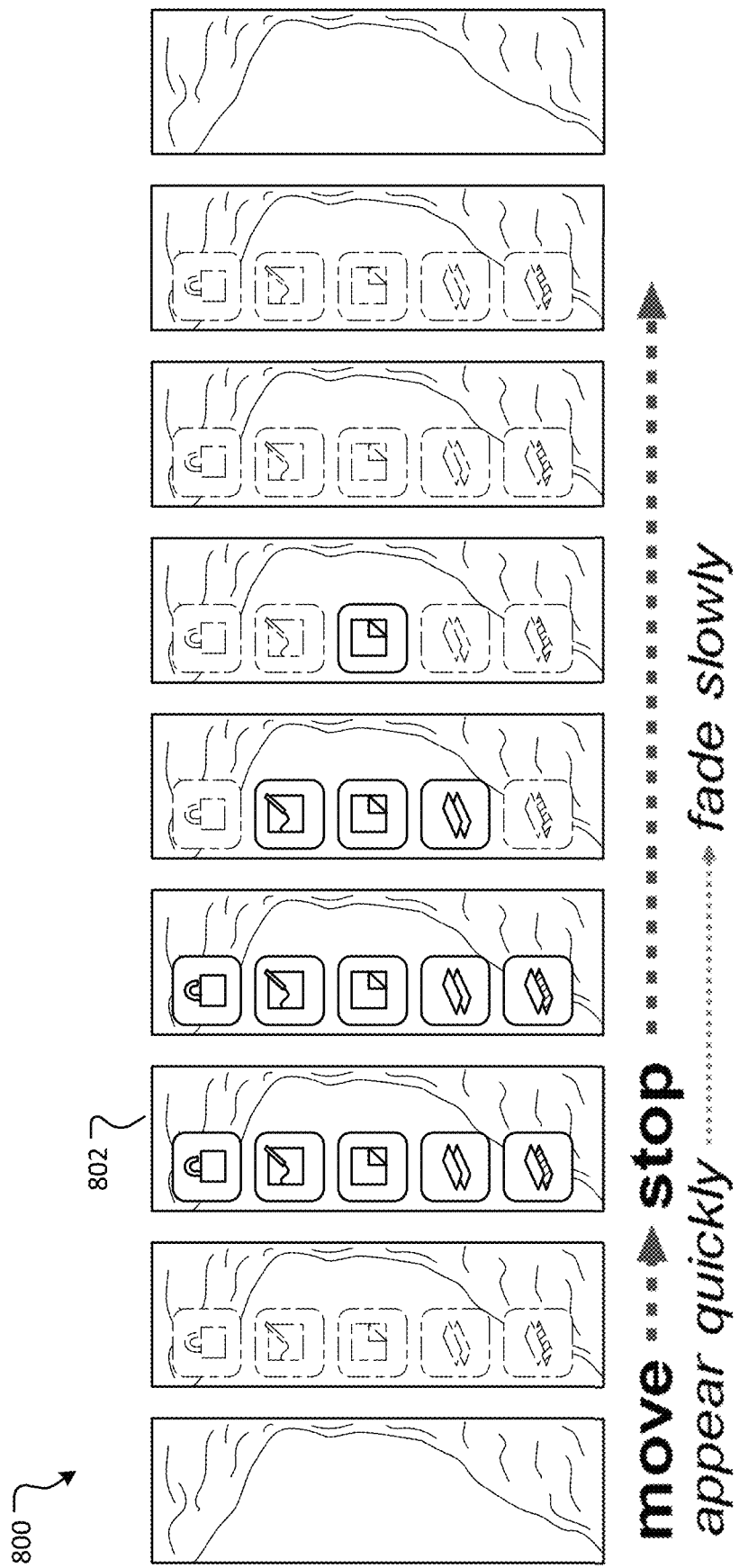
FIG. 8 illustrates details of the tilt side channel in accordance with examples of the present disclosure.

FIG. 7B also illustrates a tilt side channel 750 in accordance with aspects of the present disclosure, which is also shown and discussed also with reference to FIG. 8. The tilt side-channel includes system-wide tilt (as opposed to application-specific) controls that include a clutch 752, annotation layer 754, and notes 756, bring to front 758, and send to back 760, among other system-wide tilt controls.

Tapping on the clutch 752 turns off tilt response. This freezes the current screen, as indicated by the lock icon closing and turning bright red. The clutch 752 stays on until the user taps this clutch 752 again to unlock. This gives the user full control and flexibility to override application responses to tilt sensing, as desired, for ergonomic or other reasons. Annotation layer 754 creates a vellum-like transparent layer over the screen, and can be used in combination with the clutch 752. For example, the user can clutch, tilt down to a comfortable angle for handwriting, and then invoke the annotation layer 754 on the still-frozen screen to mark it up. Notes 756 allows a user to attach a note in a layer over the screen, similar to the annotation layer, and can be used in combination with the clutch 752. Bring to front 758, and send to back 760 allow a user to cycle through open applications to bring them to the foreground or send them to the background as desired.

FIG. 8 illustrates the motion onset, and then motion cessation, of the tilt side-channel 800 in accordance with aspects of the present disclosure. The tilt side-channel uses motion to surface or reveal command options shown in FIG. 7B. These appear as icons along the side of the screen, suitable for thumb input with the non-preferred hand. Since users typically grip the bezel near this area to adjust the display angle anyway, it offers a convenient spot for commands initiated by motion, but completed by touch. The tilt side-channel 800 responds to relative motion, rather than absolute angle. As such, there is no "gesture" associated with the tilt side-channel 800 per se. Any significant motion will cause the tilt side-channel 800 to surface. This makes it easy to bring up. If the user does intend to use it, it appears quickly, and the user can then tap the desired option with their thumb. But if the user has no intention of using the tilt side-channel 800, or adjusted tilt for other reasons—which could be considered a form of false-positive activation—then once the display stops moving, the tilt side-channel 800 simply disappears. It slowly fades away, withdrawing from attention. This makes the "cost" of appearance low (even if unintentional), with no further action required to dismiss. In aspects, the tilt side-channel 800 starts fading in (e.g., with a 500 ms animation to full opacity 802) at the onset of motion (e.g., an adjustment exceeding a motion threshold, for example approximately) 20°. When motion halts (e.g., staying within ±2° for 3 seconds), the tilt side-channel 800 fades out slowly (e.g., with a 3 second animation). Even if the tilt side-channel 800 has started to fade away, touching any icon returns the menu to full visibility, where it remains as long as the clutch (or other commands) are engaged. This gives the user a grace period (e.g., 6.5 seconds) to engage the tilt side-channel 800, at any time before it fully fades away.

Figure 9:
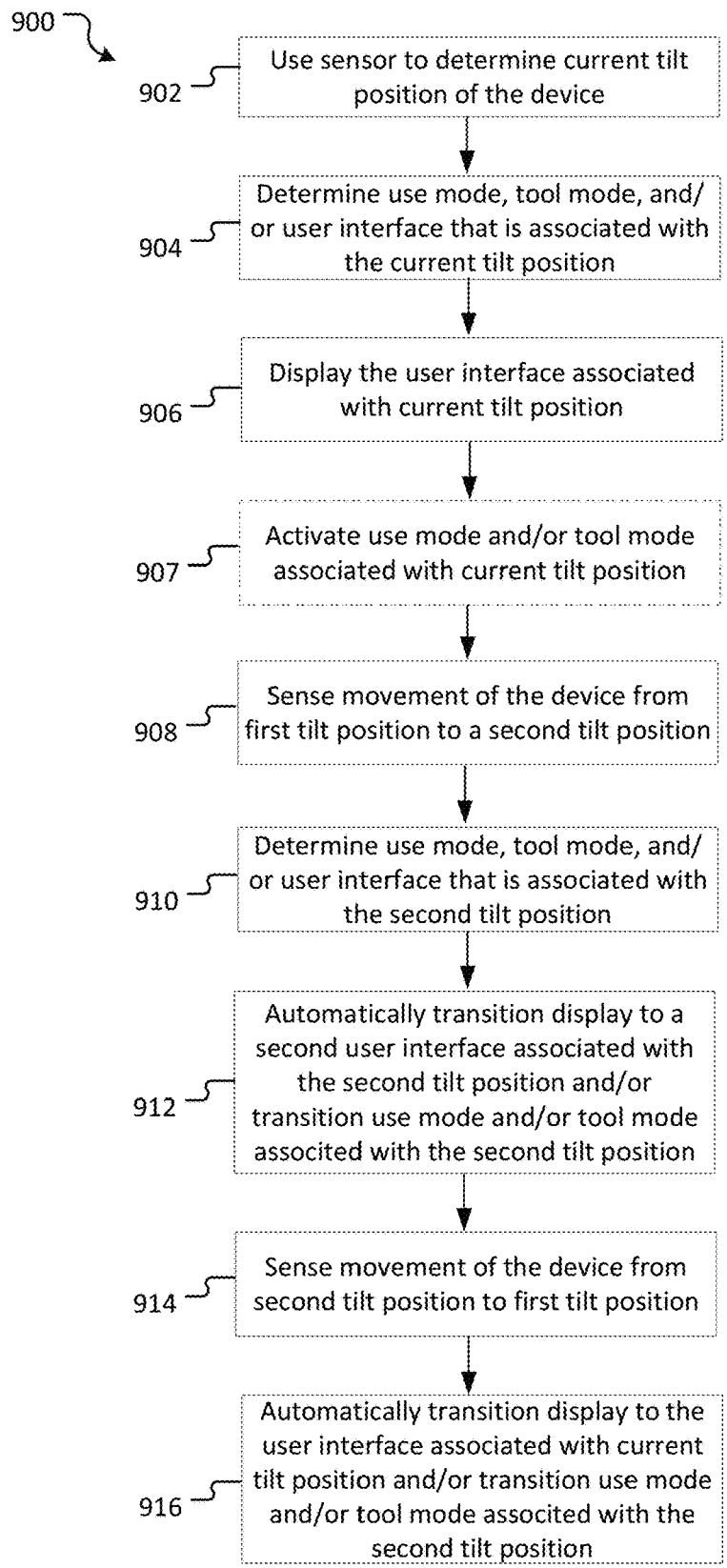
FIG. 9 depicts details of a method for automatically adjusting use mode, tool mode, and/or a user interface based on a change in tilt position of the device in accordance with examples of the present disclosure.

FIG. 9 depicts details of a method 900 for automatically changing user-interfaces and/or use modes and/or tool modes based on tilt in accordance with aspects of the present disclosure. A general order for the steps of the method 900 is shown in FIG. 9. Generally, the method 900 starts at 902 and ends at 916. The method 900 may include more or fewer steps or may arrange the order of the steps differently than those shown in FIG. 9. The method 900 can be executed as a set of computer-executable instructions executed by a computer system and encoded or stored on a computer readable medium. Further, the method 900 can be performed by gates or circuits associated with a processor, Application Specific Integrated Circuit (ASIC), a field programmable gate array (FPGA), a system on chip (SOC), or other hardware device. Hereinafter, the method 900 shall be explained with reference to the systems, components, modules, software, data structures, user interfaces, etc. described in conjunction with FIGS. 1, 2, 3A-3C, 4A-4B, 5A-5C, 6A-6C, 7A-7B, 8, 10, 11A, and 11B.

Method 900 begins at operation 902 where the sensor on the device, such as a sensor 120 on digital drawing board 100 in FIG. 1, senses a current tilt position of the device. As discussed with reference to the other figures, the current tilt position may be at any degree of freedom, such as between approximately 0 degrees and 95 degrees for the X rotation axis. In aspects, the current tilt position may be oriented about one degree of freedom, such as the x-axis, or oriented about more than one degree of freedom such as the x-axis, y-axis, and/or z-axis. In aspects, the tilt position is absolute versus relative. At operation 904, method 900 determines a use mode, tool mode, and/or a user interface that is associated with the current tilt position. For example, the current tilt position may be at 20 degrees about the x-axis, which is a low angle position as shown in FIG. 2A. Method 900 may determine that the low angle position is associated with a private use mode. In aspects, the use mode is determined based on an application that is running on the device at the time the determination is made. For example, if the device is running the sticky notes application method 900 determines that the low angle position is associated with the private use mode. In aspects, method 900 may determine the tool mode that is associated with the current tilt position. Tool modes determine a modality for an input tool based on the tilt position of the device. For example, method 900 may determine that tool mode for the stylus or pen is an inking tool mode for the low angle position and a pointer tool for the vertical position. Or method 900 may determine that the stylus/pen has a fine ink mode in the low angle position and a thick highlighter mode in the vertical position. In aspects, the tool mode is based on the application running on the device. For example, if the device is in the vertical position and running the presentation application, method 900 may determine that the tool mode for the pen/stylus in the spotlight tool mode described above with reference to FIG. 7B. Some example tool modes are shown in the table below:

| | Tool Modes | | |
|---|---|---|---|
| App Scenario/ Technique | Low Angle | transition | Vertical/ High Angle |
| Pen | Handwrite/ Sketch/ Thin ink pen | Partially Available ergonomics limits pen input | Spotlight/ Pointer/thick highlighter |
| App Scenario/ Technique | Low Angle | transition | Vertical/ High Angle |
| Touch | Bimanual pen + touch | Partially Available suitable for intermittent use | Unimanual touch or pen |
| Mouse | Available | Available | Available |
| Mechanical Keyboard | Not Available | Partially Available display takes up desk space | Available |
| Camera (front-facing) | Not Useful aimed up | Partially Useful camera view aimed off-kilter | Useful aimed at user |

In aspects, the user interface that is associated with the current tilt position is based on the application that is running in foreground of the device as described otherwise herein. At operation 906, the device displays the user interface that is associated with current tilt position. At optional operation 907, method 900 activates a use mode and/or a tool mode that is associated with the current tilt position. In aspects, the use mode and/or tool mode may also be based on the application that is running in the foreground of the device.

At operation 908, the sensor senses movement in the tilt position of the device and that the device is moving from a first tilt position (e.g., a low angle position) to a second tilt position (e.g., a middle position or a vertical position). At operation 910, method 900 determines a use mode, tool mode, and/or a user interface that is associated with second tilt position. In aspects, the use mode, tool mode, and/or user interface are determined based on an application that is running in the foreground of the device. For example, if the device is running the sticky notes application and has tilted from the low angle position to the vertical position, method 900 will determine that use mode is public and at operation 912 will display the public user interface associated with the sticky notes application. In a desktop with multiple overlapping windows, the window with the input focus may be considered as the "foreground" application. In aspects, such as a split screen (side by side windows) view, either the focus app or both apps could simultaneously respond to tilt movements. In some aspects, the applications may change in response to tilt in ways that depends on which application is present on the other half of the screen. This includes split screen, dual screen, and foldable device embodiments. In some aspects and in some applications, the display may provide continuous and gradual changes from one use mode, tool mode, and/or user interface to another use mode, tool mode, and/or user interface based on the interactively changing angle (either the virtual angle or the absolute angle). If the movement stops, the change in the display will stop as discussed above. For example, the lock screen discussed above provides continuous changes from one video frame to another as the angle of the screen changes.

In some aspects, the device provides haptic feedback during tilt transitions. For example, if the device is displaying volumetric data (e.g. a brain scan) with a plurality of images associated therewith, tilting the device might cause the images to move in a forward direction or reverse direction much like the video frames with the lock screen. A user could annotate certain of the images and then receive haptic feedback (e.g. a vibration) when tilting through an image that has an annotation. Further, this haptic feedback could also be rendered on other nearby devices such as a wearable device, the stylus/pen, and/or mouse.

In aspects, transitions between the first user interface and second user interface are animated and begin once the sensor senses movement past a threshold (e.g., near 45 degrees). Once an animated transition begins, it continues until completion. Additionally, these transitions may be implemented with several degrees of forgiveness (hysteresis) so that the system will not chatter between two states, for example, due to sensor noise or mechanical wobble. Furthermore, stopping a tilt adjustment "in the middle" does not lead to ambiguous states; indeed, with the continuous mappings used for some scenarios, the intermediate states are often interesting and lend richness to the experiences. In some embodiments, the two states may cross-fade continuously based on the degree of tilt, such as for a teleconferencing application that wishes to show a semi-transparent video feed of the face-to-face conversation on top of a shared whiteboard visible simultaneously underneath.

At operation 914, the sensor senses movement in the tilt position of the device and that it is moving from a second tilt position (e.g., a vertical position) back to the first tilt position (e.g., a vertical position). At operation 916, method 900 displays the user interface associated with the first tilt position. In some aspects and in some applications, the display may provide continuous and gradual changes from one use mode, tool mode, and/or user interface to another use mode, tool mode, and/or user interface based on the interactively changing angle (either the virtual angle or the absolute angle). If the movement stops, the change in the display will stop as discussed above. For example, the lock screen discussed above provides continuous changes from one video frame to another as the angle of the screen changes.

In aspects, the following table provides tilt positions and examples of associated use modes based on the application running in the foreground of the device:

| | | Use Modes | |
|---|---|---|---|
| App Scenario | Low Angle | transition | Vertical/ High Angle |
| Lock Screen (sign in/out) | Private/ Detail | Interactive time-lapse; Fade in/fade out details | Public/ Holistic |
| Desktop View | Freeform | Animate between layouts | Organized |
| Document | Handwrite/ Annotate | Show pen tools vs. toolbar Call-outs vs. in-line notes Adapt orient. & line spacing | Read/Edit Text |
| Teleconference | Task Space | Zoom to task/person space Fade in/out camera view | Person Space |
| Sticky Notes | Messy/ Personal | Show/hide personal content | Tidy/ Public |
| Presentation | Authoring | Slide-sorter vs. single slide Pen writes vs. spotlights | Presenting |
| Live Photos | Start | Continuous interactive browsing through timeline | End |

Figure 10:
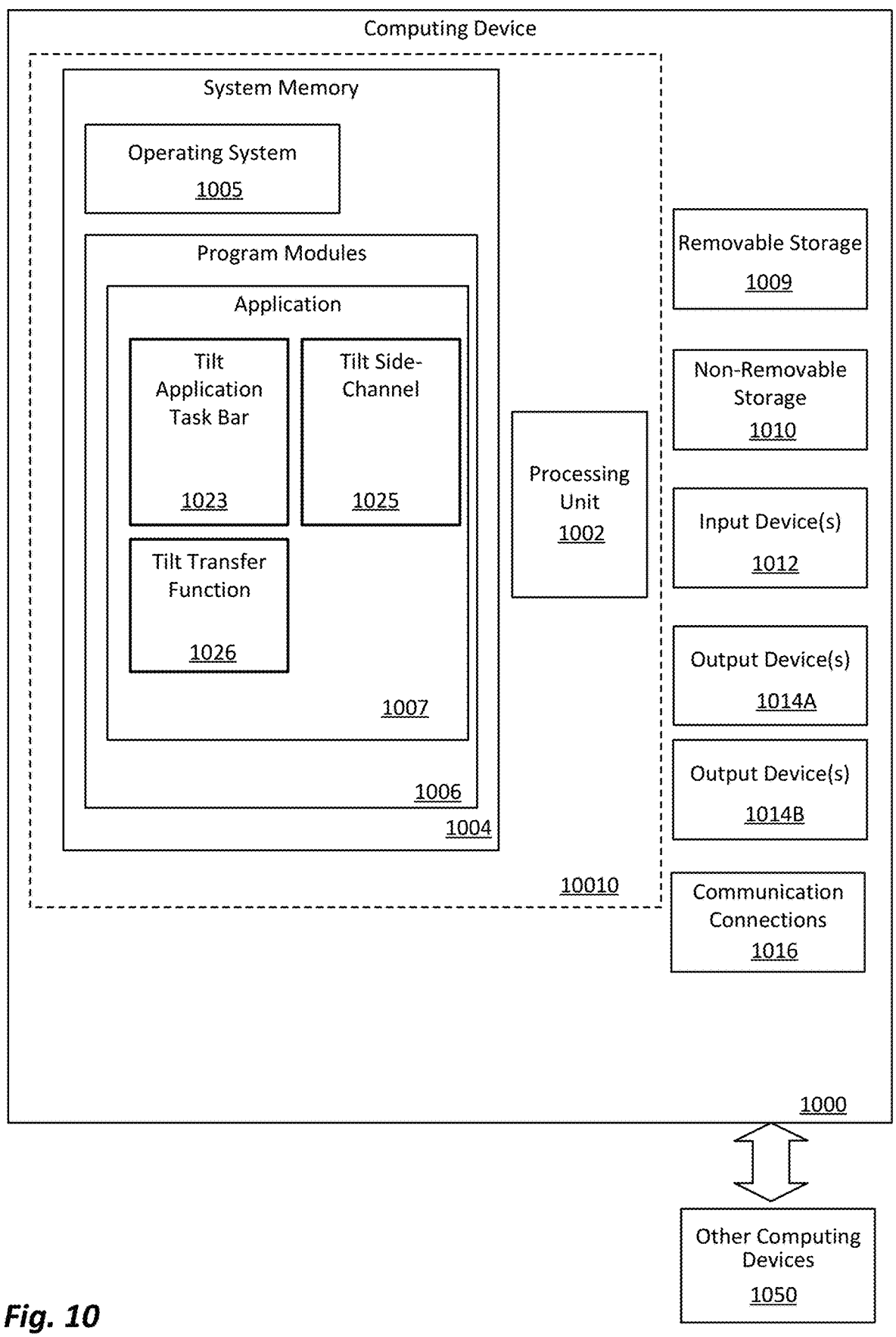
FIG. 10 depicts block diagram illustrating physical components (e.g., hardware) of a computing device with which aspects of the disclosure may be practiced.
Figure 11A:
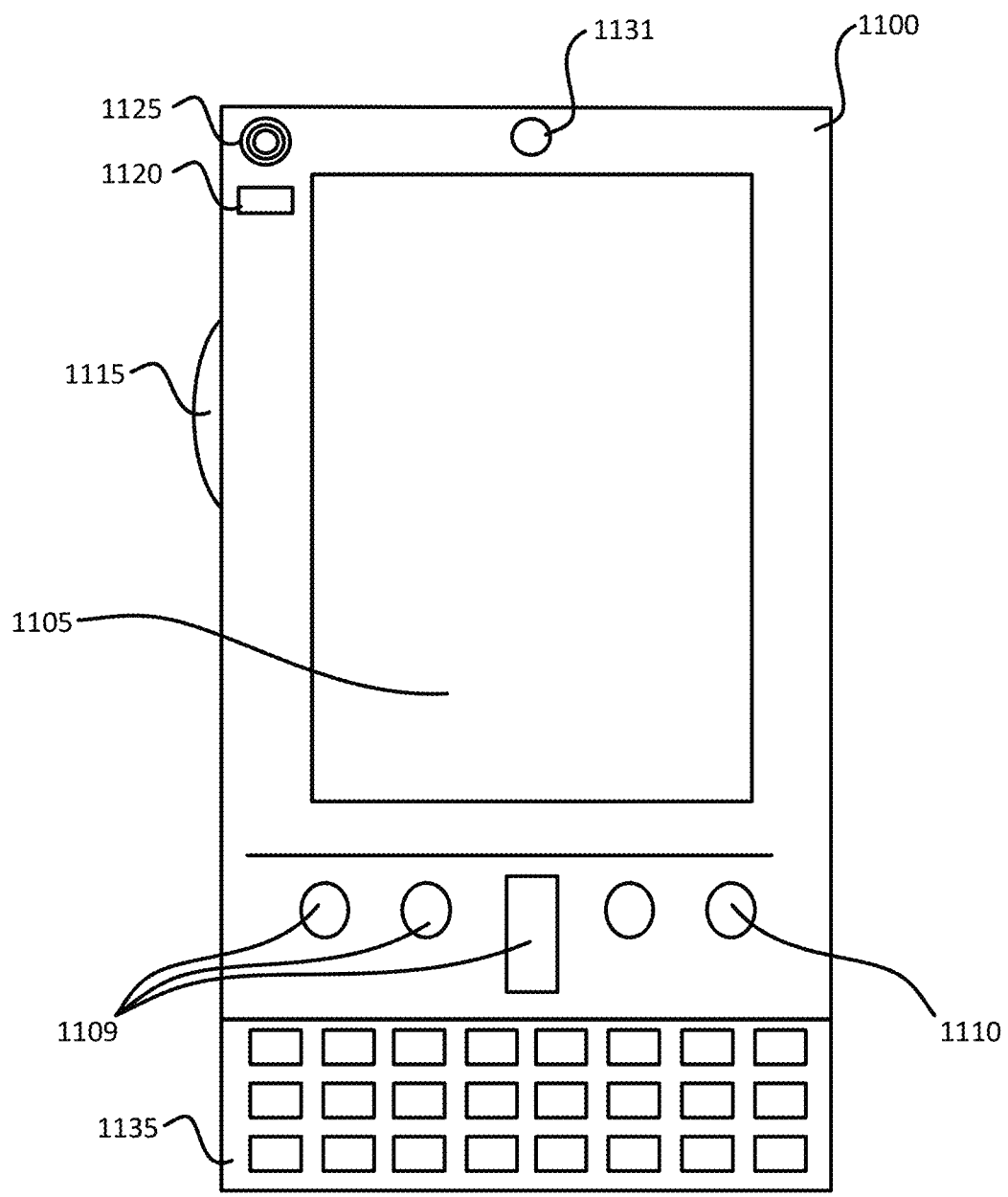
FIG. 11A illustrates a first example of a computing device with which aspects of the disclosure may be practiced.
Figure 11B:
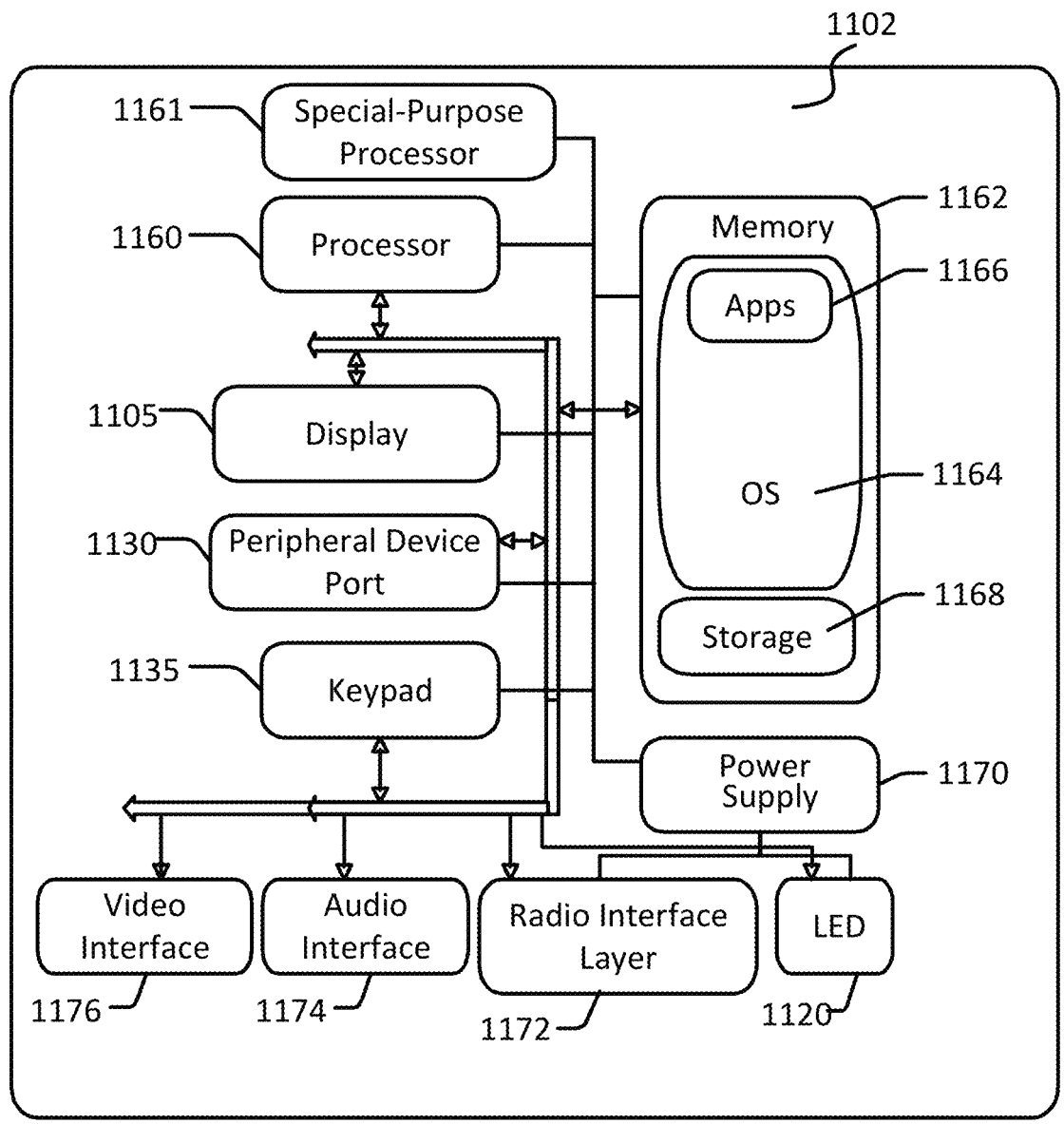
FIG. 11B illustrates a second example of a computing device with which aspects of the disclosure may be practiced.

FIGS. 10, 11A, and 11B and the associated descriptions provide a discussion of a variety of operating environments in which aspects of the disclosure may be practiced. However, the devices and systems illustrated and discussed with respect to FIGS. 10-11B are for purposes of example and illustration and are not limiting of a vast number of computing device configurations that may be utilized for practicing aspects of the disclosure, described herein.

FIG. 10 is a block diagram illustrating physical components (e.g., hardware) of a computing device 1000 with which aspects of the disclosure may be practiced. The computing device components described below may be suitable for the computing devices described above. In a basic configuration, the computing device 1000 may include at least one processing unit 1002 and a system memory 1004. Depending on the configuration and type of computing device, the system memory 1004 may comprise, but is not limited to, volatile storage (e.g., random access memory), non-volatile storage (e.g., read-only memory), flash memory, or any combination of such memories.

The system memory 1004 may include an operating system 1005 and one or more program modules 1006 suitable for running software applications 1007, such as but not limited to a tilt application task bar 1023, a tilt side-channel 1025, and a tilt transfer function 1026, and/or one or more components supported by the systems described herein.

Furthermore, embodiments of the disclosure may be practiced in conjunction with a graphics library, other operating systems, or any other application program and is not limited to any particular application or system. This basic configuration is illustrated in FIG. 10 by those components within a dashed line 1008. The computing device 1000 may have additional features or functionality. For example, the computing device 1000 may also include additional data storage devices (removable and/or non-removable) such as, for example, magnetic disks, optical disks, or tape. Such additional storage is illustrated in FIG. 10 by a removable storage device 1009 and a non-removable storage device 1010.

As stated above, a number of program modules and data files may be stored in the system memory 1004. While executing on the at least one processing unit 1002, the program modules 1006 may perform processes including, but not limited to, one or more aspects, as described herein. Other program modules that may be used in accordance with aspects of the present disclosure may include electronic mail and contacts applications, word processing applications, spreadsheet applications, database applications, slide presentation applications, drawing or computer-aided application programs, etc., and/or one or more components supported by the systems described herein.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 10 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1000 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1000 may also have one or more input device(s) 1012 such as a keyboard, a mouse, a pen, a sound or voice input device, a touch or swipe input device, etc. The output device(s) 1014A such as a display, speakers, a printer, etc. may also be included. An output 1014B, corresponding to a virtual display may also be included. The aforementioned devices are examples and others may be used. The computing device 1000 may include one or more communication connections 1016 allowing communications with other computing devices 1050. Examples of suitable communication connections 1016 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1004, the removable storage device 1009, and the non-removable storage device 1010 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1000. Any such computer storage media may be part of the computing device 1000. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 11A and 11B illustrate a mobile computing device 1100, for example, a mobile telephone, a smart phone, wearable computer (such as a smart watch), a tablet computer, a laptop computer, and the like, with which aspects of the disclosure may be practiced. With reference to FIG. 11A, one aspect of a mobile computing device 1100 for implementing the aspects is illustrated. In a basic configuration, the mobile computing device 1100 is a handheld computer having both input elements and output elements. The mobile computing device 1100 typically includes a display 1105 and one or more input buttons 1110 that allow the user to enter information into the mobile computing device 1100. The display 1105 of the mobile computing device 1100 may also function as an input device (e.g., a touch screen display). If included, an optional side input element 1115 allows further user input. The side input element 1115 may be a rotary switch, a button, or any other type of manual input element. In alternative aspects, mobile computing device 1100 may incorporate more or less input elements. For example, the display 1105 may not be a touch screen in some aspects. In yet another alternative aspect, the mobile computing device 1100 is a portable phone system, such as a cellular phone. The mobile computing device 1100 may also include an optional keypad 1135. Optional keypad 1135 may be a physical keypad or a "soft" keypad generated on the touch screen display. In various aspects, the output elements include the display 1105 for showing a graphical user interface (GUI), a visual indicator 1131 (e.g., a light emitting diode), and/or an audio transducer 1125 (e.g., a speaker). In some aspects, the mobile computing device 1100 incorporates a vibration transducer for providing the user with tactile feedback. In yet another aspect, the mobile computing device 1100 incorporates input and/or output ports, such as an audio input (e.g., a microphone jack), an audio output (e.g., a headphone jack), and a video output (e.g., a HDMI port) for sending signals to or receiving signals from an external source.

FIG. 11B is a block diagram illustrating the architecture of one aspect of computing device, a server, or a mobile computing device. That is, the computing device 1100 can incorporate a system (e.g., an architecture) 1102 to implement some aspects. The system 1102 can implemented as a "smart phone" capable of running one or more applications (e.g., browser, e-mail, calendaring, contact managers, messaging clients, games, and media clients/players). In some aspects, the system 1102 is integrated as a computing device, such as an integrated personal digital assistant (PDA) and wireless phone.

One or more application programs 1166 may be loaded into the memory 1162 and run on or in association with the operating system 1164. Examples of the application programs include phone dialer programs, e-mail programs, personal information management (PIM) programs, word processing programs, spreadsheet programs, Internet browser programs, messaging programs, and/or one or more components supported by the systems described herein. The system 1102 also includes a non-volatile storage area 1168 within the memory 1162. The non-volatile storage area 1168 may be used to store persistent information that should not be lost if the system 1102 is powered down. The application programs 1166 may use and store information in the non-volatile storage area 1168, such as e-mail or other messages used by an e-mail application, and the like. A synchronization application (not shown) also resides on the system 1102 and is programmed to interact with a corresponding synchronization application resident on a host computer to keep the information stored in the non-volatile storage area 1168 synchronized with corresponding information stored at the host computer. As should be appreciated, other applications may be loaded into the memory 1162 and run on the mobile computing device 1100 described herein (e.g. a tilt application task bar 1023, a tilt side-channel 1025, and a tilt transfer function 1026, etc.).

The system 1102 has a power supply 1170, which may be implemented as one or more batteries. The power supply 1170 might further include an external power source, such as an AC adapter or a powered docking cradle that supplements or recharges the batteries.

The system 1102 may also include a radio interface layer 1172 that performs the function of transmitting and receiving radio frequency communications. The radio interface layer 1172 facilitates wireless connectivity between the system 1102 and the "outside world," via a communications carrier or service provider. Transmissions to and from the radio interface layer 1172 are conducted under control of the operating system 1164. In other words, communications received by the radio interface layer 972 may be disseminated to the application programs 1166 via the operating system 1164, and vice versa.

The visual indicator 1120 may be used to provide visual notifications, and/or an audio interface 1174 may be used for producing audible notifications via the audio transducer 1125. In the illustrated configuration, the visual indicator 1120 is a light emitting diode (LED) and the audio transducer 1125 is a speaker. These devices may be directly coupled to the power supply 1170 so that when activated, they remain on for a duration dictated by the notification mechanism even though the processor 1160 and other components might shut down for conserving battery power. The LED may be programmed to remain on indefinitely until the user takes action to indicate the powered-on status of the device. The audio interface 1174 is used to provide audible signals to and receive audible signals from the user. For example, in addition to being coupled to the audio transducer 1125, the audio interface 1174 may also be coupled to a microphone to receive audible input, such as to facilitate a telephone conversation. In accordance with aspects of the present disclosure, the microphone may also serve as an audio sensor to facilitate control of notifications, as will be described below. The system 1102 may further include a video interface 1176 that enables an operation of an on-board camera to record still images, video stream, and the like.

A mobile computing device 1100 implementing the system 1102 may have additional features or functionality. For example, the mobile computing device 1100 may also include additional data storage devices (removable and/or non-removable) such as, magnetic disks, optical disks, or tape. Such additional storage is illustrated in FIG. 11B by the non-volatile storage area 1168.

Data/information generated or captured by the mobile computing device 1100 and stored via the system 1102 may be stored locally on the mobile computing device 1100, as described above, or the data may be stored on any number of storage media that may be accessed by the device via the radio interface layer 1172 or via a wired connection between the mobile computing device 1100 and a separate computing device associated with the mobile computing device 1100, for example, a server computer in a distributed computing network, such as the Internet. As should be appreciated such data/information may be accessed via the mobile computing device 1100 via the radio interface layer 1172 or via a distributed computing network. Similarly, such data/information may be readily transferred between computing devices for storage and use according to well-known data/information transfer and storage means, including electronic mail and collaborative data/information sharing systems.

FIG. 12 illustrates one aspect of the architecture of a system for processing data received at a computing system from a remote source, such as a personal computer 1204, tablet computing device 1206, or mobile computing device 1208, as described above. Content displayed at server device 1202 may be stored in different communication channels or other storage types.

FIG. 12 illustrates an exemplary mobile computing device 1200 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the steps, functions, and operations discussed herein can be performed continuously and automatically.

The exemplary systems and methods of this disclosure have been described in relation to computing devices. However, to avoid unnecessarily obscuring the present disclosure, the preceding description omits a number of known structures and devices. This omission is not to be construed as a limitation. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed configurations and aspects.

A number of variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

The disclosure is not limited to standards and protocols if described. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

In accordance with examples of the present disclosure, a method for automatically adjusting a user interface based on tilt position of a digital drawing board comprises: using a sensor to determine that the digital drawing board has a first tilt position, wherein the first tilt position is an absolute position; providing for display a first user interface associated with the first tilt position, wherein the first user interface is associated with a first use mode; sensing, by the sensor, that the digital drawing board has moved from the first tilt position to a second tilt position, wherein the second tilt position is an absolute position; and automatically providing for display a second user interface associated with a second tilt position, wherein second user interface has different functionality than the first user interface and the second user interface is associated with a second use mode that is different than the first use mode. In an example, the digital drawing board comprises a dual screen digital drawing board. In an example, the first tilt position is a vertical position. In another example, the second tilt position is a low angle position. In another example, the first tilt position and the second tilt position are oriented about one degree of freedom based on an x-axis of the device. In another example, the first use mode is a private use mode and the second use mode is a public use mode. In another example, the first use mode is a handwriting use mode and the second use mode is a text edit use mode. In an example, the method further comprises determining that the first user interface is associated with the first tilt position based on an application running on the digital drawing board. In another example, the method further comprises sensing, by the sensor, that the digital drawing board has moved from the second tilt position to the first tilt position; and automatically providing for display the first user interface.

In accordance with further examples of the present disclosure, a device comprises: a tiltable screen with a sensor, wherein the tiltable screen may be fixed in a stable tilt position; a processor; and memory storing computer executable instructions that when executed by the processor cause the device to: determine, by the sensor, a first tilt position of the screen; display on the screen a first user interface associated with the first tilt position and a first use mode, wherein the first user interface is based on an application running on the device; sense, by the sensor, that the screen is moving from the first tilt position to a second tilt position; and automatically transition the display on the screen from the first user interface to a second user interface associated with the second tilt position, wherein second user interface has different functionality than the first user interface and the second user interface is associated with a second use mode that is different than the first use mode. In an example, the device is a digital drawing board. In another example, the application is a word processing application, the first tilt position is a vertical position, the second tilt position is a low angle position, and automatically transitioning the display on the screen from the first user interface to a second user interface further comprises one or more of: removing a display of a word processing toolbar from the first user interface; expanding a spacing between lines of text in a document displayed in the first user interface; rotating a document displayed in the first user interface from a vertical position to an angled position; adding pen tools to the second user interface; and converting a call-out text comment in the first user-interface to an in-line ink comment in the second user interface. In another example, the application is a videoconferencing application, the first tilt position is a vertical position, the second tilt position is a low angle position, and automatically transitioning the display on the screen from the first user interface to a second user interface further comprises one or more of: removing a display of an image captured from a camera of the device from the first user interface; adding pen tools to the second user interface; automatically sharing a document displayed on the second user interface with another videoconference participant. In another example, the application is a presentation application, the first tilt position is a low angle position, the second tilt position is a vertical position, and automatically transitioning the display on the screen from the first user interface to a second user interface further comprises one or more of: removing a display of a presentation toolbar from the first user interface; removing a display of thumbnail slides from the first user interface; adding pen tools to the second user interface; and adding a spotlight tool to the second user interface.

In accordance with further examples of the present disclosure, a method for automatically adjusting a user interface based on tilt position of a digital drawing board, the method comprising: determining, by a sensor, a first tilt position of the digital drawing board; displaying a first user interface associated with the first tilt position, wherein the first user interface is based on an application running on the digital drawing board and the first user interface is associated with a first use mode; sensing, by the sensor, that the digital drawing board is moving from the first tilt position to a second tilt position; and automatically transitioning from the first user interface to a second user interface associated with the second tilt position, wherein second user interface has different functionality than the first user interface and the second user interface is associated with a second use mode that is different than the first use mode. In an example, the method further comprises revealing a tilt side-channel in response to sensing that the digital drawing board is moving. In another example, the tilt side-channel further comprises a clutch control. In an example, the method further comprises receiving selection of the clutch control while the digital drawing board is moving from the first tilt position to the second tilt position; and stopping the automatic transition from the first user interface to the second user interface while the digital drawing board continues to move to the second tilt position. In another example, the digital drawing board is a dual screen digital drawing board. In another example, the second user interface is based on the application running on the digital drawing board.

The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

The invention claimed is:

1. A method for automatically adjusting a user interface based on tilt position of a digital drawing board, the method comprising:
using a sensor to determine that the digital drawing board has a first tilt position, wherein the first tilt position is based on a first absolute angle;
providing for display a first user interface associated with the first tilt position, wherein the first user interface is associated with a first use mode;
sensing, by the sensor, that the digital drawing board has moved from the first tilt position to a second tilt position, wherein the second tilt position is based on a second absolute angle;
automatically providing for display a second user interface associated with the second tilt position, wherein the second user interface has different functionality than the first user interface and the second user interface is associated with a second use mode that is different than the first use mode;
revealing a tilt side channel in response to sensing that the digital drawing board is moving from the first tilt position to the second tilt position; and
hiding the tilt side channel in response to sensing that the digital drawing board has stopped moving.

2. The method of claim 1 wherein the first tilt position is a vertical position.

3. The method of claim 1 wherein the second tilt position is a low angle position.

4. The method of claim 1 wherein the first tilt position and the second tilt position are oriented about one degree of freedom based on an x-axis of the device.

5. The method of claim 1 wherein the first use mode is a private use mode and the second use mode is a public use mode.

6. The method of claim 1 wherein the first use mode is a handwriting use mode and the second use mode is a text edit use mode.

7. The method of claim 1 further comprising:
determining that the first user interface is associated with the first tilt position based on an application running on the digital drawing board.

8. The method of claim 1 wherein the tilt side-channel further comprises a clutch control.

9. The method of claim 8, wherein activating the clutch control prevents the automatic transitioning from the first user interface to the second user interface.

10. The method of claim 1 wherein the tilt-side channel comprises tilt function controls.

11. A device comprising:
a tiltable screen with a sensor, wherein the tiltable screen may be fixed in a stable tilt position;
a processor; and
memory storing computer executable instructions that when executed by the processor cause the device to:
determine, by the sensor, a first tilt position of the screen, wherein the first tilt position is based on a first absolute angle;
display on the screen a first user interface associated with the first tilt position and a first use mode, wherein the first user interface is based on an application running on the device;

sense, by the sensor, that the screen is moving from the first tilt position to a second tilt position, wherein the second tilt position is based on a second absolute angle;

automatically transition the display on the screen from the first user interface to a second user interface associated with the second tilt position, wherein the second user interface has different functionality than the first user interface and the second user interface is associated with a second use mode that is different than the first use mode;

revealing a tilt side channel in response to sensing that the digital drawing board is moving from the first tilt position to the second tilt position; and hiding the tilt side channel in response to sensing that the digital drawing board has stopped moving.

12. The device of claim 11 wherein the device is a digital drawing board.

13. The device of claim 1 wherein the application is a word processing application, the first tilt position is a vertical position, the second tilt position is a low angle position, and automatically transitioning the display on the screen from the first user interface to a second user interface further comprises one or more of:

removing a display of a word processing toolbar from the first user interface;

expanding a spacing between lines of text in a document displayed in the first user interface;

rotating a document displayed in the first user interface from a vertical position to an angled position;

adding pen tools to the second user interface; and converting a call-out text comment in the first user-interface to an in-line ink comment in the second user interface.

14. The device of claim 11 wherein the application is a videoconferencing application, the first tilt position is a vertical position, the second tilt position is a low angle position, and automatically transitioning the display on the screen from the first user interface to a second user interface further comprises one or more of:

removing a display of an image captured from a camera of the device from the first user interface;

adding pen tools to the second user interface; and automatically sharing a document displayed on the second user interface with another videoconference participant.

15. The device of claim 11 wherein the application is a presentation application, the first tilt position is a low angle position, the second tilt position is a vertical position, and automatically transitioning the display on the screen from the first user interface to a second user interface further comprises one or more of:

removing a display of a presentation toolbar from the first user interface;

removing a display of thumbnail slides from the first user interface;

adding pen tools to the second user interface; and adding a spotlight tool to the second user interface.

16. A method for automatically adjusting a user interface based on tilt position of a digital drawing board, the method comprising:

determining, by a sensor, a first tilt position of the digital drawing board, wherein the first tilt position is based on a first absolute angle;

displaying a first user interface associated with the first tilt position, wherein the first user interface is based on an application running on the digital drawing board and the first user interface is associated with a first use mode;

sensing, by the sensor, that the digital drawing board is moving from the first tilt position to a second tilt position, wherein the second tilt position is based on a second absolute angle;

automatically transitioning from the first user interface to a second user interface associated with the second tilt position, wherein the second user interface has different functionality than the first user interface and the second user interface is associated with a second use mode that is different than the first use mode; and revealing a tilt side channel, in response to sensing that the digital drawing board is moving from the first tilt position until the digital drawing board reaches the second tilt position or stops moving.

17. The method of claim 16 wherein the tilt side-channel further comprises a clutch control.

18. The method of claim 17 further comprising:

receiving selection of the clutch control while the digital drawing board is moving from the first tilt position to the second tilt position; and stopping the automatic transition from the first user interface to the second user interface while the digital drawing board continues to move to the second tilt position.

19. The method of claim 17, wherein activating the clutch control prevents the automatic transitioning from the first user interface to the second user interface.

20. The method of claim 16 wherein the second user interface is based on the application running on the digital drawing board.

* * * * *